(12) United States Patent
Kanda

(10) Patent No.: US 11,169,072 B1
(45) Date of Patent: Nov. 9, 2021

(54) FLOW CELL, FLOW CHAMBER, PARTICLE SORTING APPARATUS, AND PARTICLE SORTING APPARATUS CARTRIDGE

(71) Applicant: Allied Flow Inc., Nishinomiya (JP)

(72) Inventor: Masahiko Kanda, Nishinomiya (JP)

(73) Assignee: Allied Flow Inc., Nishinomiya (JP)

( * ) Notice: Subject to any disclaimer, the term of this patent is extended or adjusted under 35 U.S.C. 154(b) by 187 days.

(21) Appl. No.: 16/623,624

(22) PCT Filed: Aug. 23, 2018

(86) PCT No.: PCT/JP2018/031138
§ 371 (c)(1),
(2) Date: Dec. 17, 2019

(87) PCT Pub. No.: WO2020/039540
PCT Pub. Date: Feb. 27, 2020

(51) Int. Cl.
*G01N 21/00* (2006.01)
*G01N 15/14* (2006.01)

(52) U.S. Cl.
CPC ....... *G01N 15/14* (2013.01); *G01N 2015/149* (2013.01); *G01N 2015/1493* (2013.01)

(58) Field of Classification Search
CPC .... G01J 3/02; G01J 3/513; G01J 3/51; G01N 15/1459; G01N 21/65
USPC ......................................................... 356/73
See application file for complete search history.

(56) References Cited

U.S. PATENT DOCUMENTS

| | | |
|---|---|---|
| 5,173,740 A | 12/1992 | Fukuda et al. |
| 5,905,214 A | 5/1999 | Inami |
| 7,867,449 B2 * | 1/2011 | Sakaguchi ........... G01N 21/553 422/524 |
| 2004/0062685 A1 | 4/2004 | Norton et al. |
| 2007/0148043 A1 | 6/2007 | Norton et al. |
| 2008/0291425 A1 | 11/2008 | Norton et al. |
| 2011/0201884 A1* | 8/2011 | Kishioka ................ A61B 1/042 600/109 |
| 2011/0259749 A1 | 10/2011 | Kanda |
| 2011/0284378 A1 | 11/2011 | Shinoda |
| 2014/0346047 A1 | 11/2014 | Shinoda |

(Continued)

FOREIGN PATENT DOCUMENTS

| | | |
|---|---|---|
| JP | 04-059450 U | 5/1992 |
| JP | 08-015125 A | 1/1996 |
| JP | 09-318522 A | 12/1997 |

(Continued)

OTHER PUBLICATIONS

International Search Report for PCT/JP2018/031138 dated Nov. 20, 2018. [PCT/ISA/210].

*Primary Examiner* — Md M Rahman
(74) *Attorney, Agent, or Firm* — Sughrue Mion, PLLC

(57) ABSTRACT

A flow cell includes a flow cell body portion. The flow cell body portion is provided with a flow channel. A second end portion of the flow cell is provided with a nozzle receiving portion. The flow channel extends from the first end portion of the flow cell body portion to the nozzle receiving portion. The nozzle receiving portion is tapered toward the flow channel. The flow cell includes a convex lens. The convex lens is attached on a portion of the outer side surface of the flow cell body portion close to the second end portion. The nozzle receiving portion is located at a side close to the second end portion relative to an optical axis of the convex lens.

15 Claims, 17 Drawing Sheets

(56) References Cited

U.S. PATENT DOCUMENTS

2016/0084748 A1  3/2016  Shinoda
2019/0143330 A1  5/2019  Kanda

FOREIGN PATENT DOCUMENTS

| JP | 2001-264233 A | 9/2001 |
| JP | 2004-117363 A | 4/2004 |
| JP | 2005-501290 A | 1/2005 |
| JP | 2011-232033 A | 11/2011 |
| JP | 2017-201278 A | 11/2017 |
| WO | 03019265 A1 | 3/2003 |
| WO | 2010095391 A1 | 8/2010 |

* cited by examiner

FLOW CELL, FLOW CHAMBER, PARTICLE SORTING APPARATUS, AND PARTICLE SORTING APPARATUS CARTRIDGE

CROSS REFERENCE TO RELATED APPLICATIONS

This application is a National Stage of International Application No. National Stage of PCT/JP2018/031138 filed Aug. 23, 2018.

TECHNICAL FIELD

The present invention relates to a flow cell, a flow chamber, a particle sorting apparatus, and a particle sorting apparatus cartridge.

BACKGROUND ART

Due to progress in biotechnology, in various fields including medical science and biology, a demand has been increased for an apparatus that performs a process such as sorting or analysis on a multiplicity of cell particles, which are exemplary biological particles. As one example of such an apparatus, Japanese Patent Laying-Open No. 2017-201278 (Patent Literature 1) discloses a cell sorter. Specifically, the cell sorter disclosed in Patent Literature 1 includes a flow cell, a transparent window member, and an optical mechanism. In the flow cell, a sample liquid enclosed with a sheath liquid flows. The transparent window member fluidly isolates the optical mechanism from a space in which the flow cell is disposed. The optical mechanism includes a light receiving unit that detects light (fluorescence or scattered light) emitted from a cell particle irradiated with laser light so as to detect identification information of the cell particle. The fluorescence or scattered light emitted from the cell particle passes through the transparent window member, and enters the light receiving unit.

CITATION LIST

Patent Literature

PTL 1: Japanese Patent Laying-Open No. 2017-201278

SUMMARY OF INVENTION

Technical Problem

In the cell sorter disclosed in Patent Literature 1, however, an angle of the light that can be received by the light receiving unit is limited. Hence, it is difficult to detect, with high sensitivity, the identification information that characterizes the cell particle. The present invention has been made in view of the above-described problem, and has an object to provide a flow cell, a flow chamber, a particle sorting apparatus, and a particle sorting apparatus cartridge, by each of which identification information that characterizes a particle can be detected with improved sensitivity and the particle can be sorted with improved sorting precision.

Solution to Problem

A flow cell according to the present invention includes a flow cell body portion. The flow cell body portion has a first end portion, a second end portion opposite to the first end portion, and an outer side surface extending between the first end portion and the second end portion. The flow cell body portion is provided with a flow channel. The second end portion is provided with a nozzle receiving portion communicating with the flow channel. The flow channel extends from the first end portion to the nozzle receiving portion. The nozzle receiving portion is tapered toward the flow channel. The flow cell according to the present invention includes a convex lens. The convex lens is attached on a portion of the outer side surface of the flow cell body portion close to the second end portion. The nozzle receiving portion is located at a side close to the second end portion relative to an optical axis of the convex lens.

A flow chamber according to the present invention includes: the flow cell according to the present invention; and a chamber attached to the flow cell. A cavity of the chamber communicates with the flow channel.

A particle sorting apparatus according to the present invention includes: the flow chamber according to the present invention; and a detection optical system optically coupled to the convex lens. The detection optical system includes a detection side lens optical system.

A particle sorting apparatus cartridge according to the present invention includes: the flow chamber according to the present invention; a cartridge case that contains the flow chamber; a transparent window member that faces the convex lens; and a sample collection member that collects a droplet ejected from the flow cell according to the present invention.

Advantageous Effects of Invention

With the flow cell, the flow chamber, the particle sorting apparatus, and the particle sorting apparatus cartridge according to the present invention, the identification information that characterizes the particle can be detected with improved sensitivity and the particle can be sorted with improved sorting precision.

DESCRIPTION OF EMBODIMENTS

Figure 1:
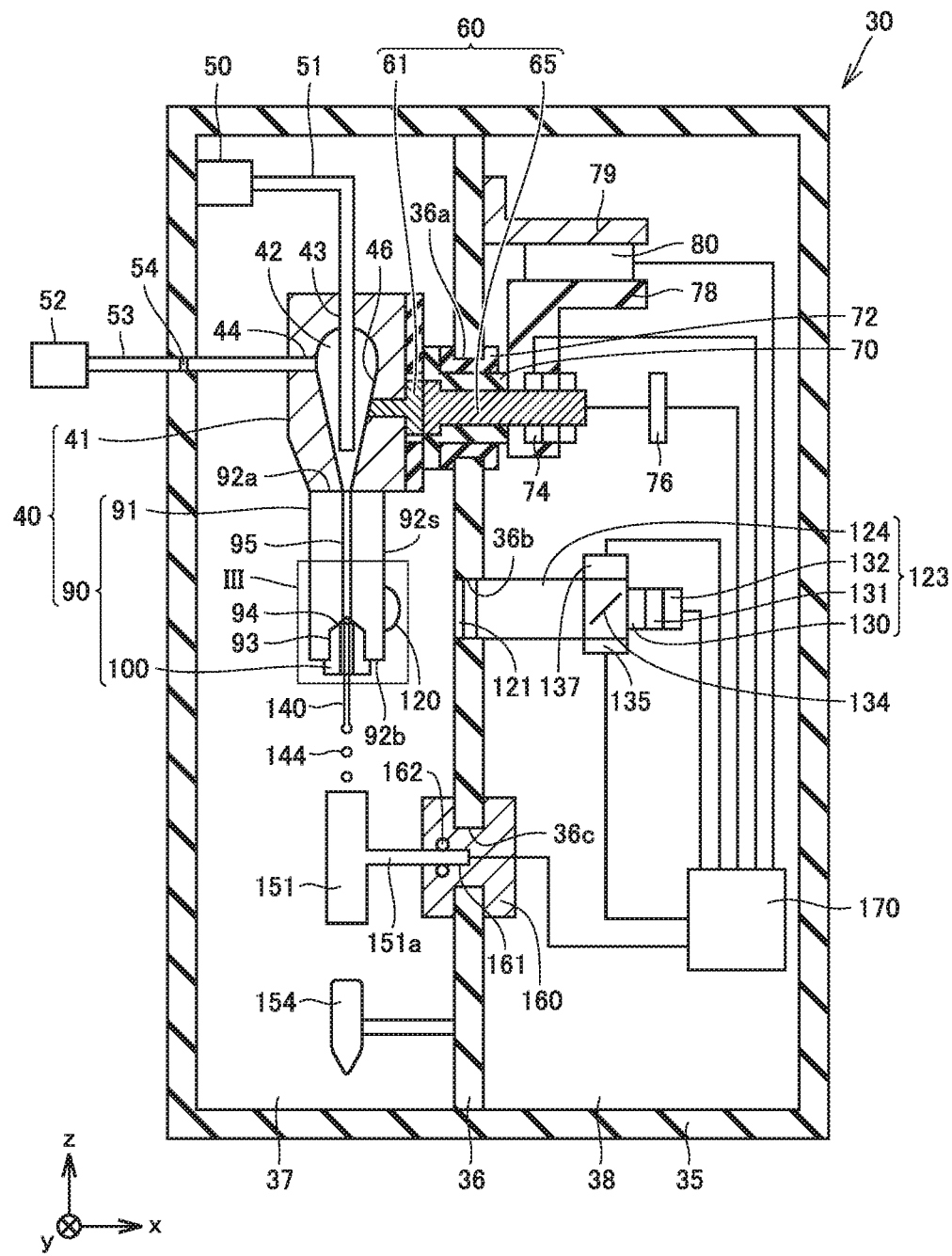
FIG. 1 is a schematic cross sectional view of a particle sorting apparatus according to a first embodiment.

Hereinafter, embodiments of the present invention will be described. It should be noted that the same configurations are given the same reference numbers and will not be described repeatedly.

First Embodiment

With reference to FIG. 1 to FIG. 9, the following describes a flow cell 90, a flow chamber 40, and a particle sorting apparatus 30 according to a first embodiment. Particle sorting apparatus 30 sorts particles 145 (see FIG. 3) included in a sample liquid in the following manner. Each of particles 145 included in the sample liquid is irradiated with excitation light 111 (see FIG. 5 and FIG. 6). Based on identification information that is specific to particle 145 and that is obtained by detecting light 117 (for example, fluorescence or scattered light; see FIG. 3 to FIG. 5) emitted from particle 145, charges are selectively applied to a droplet 144 sent out from flow cell 90. A DC electric field is formed on a path in which droplet 144 falls, thereby sorting out a route of droplet 144. In this way, particles 145 included in droplets 144 are sorted. Particles 145 are biological particles such as cell particles, for example.

Figure 9:
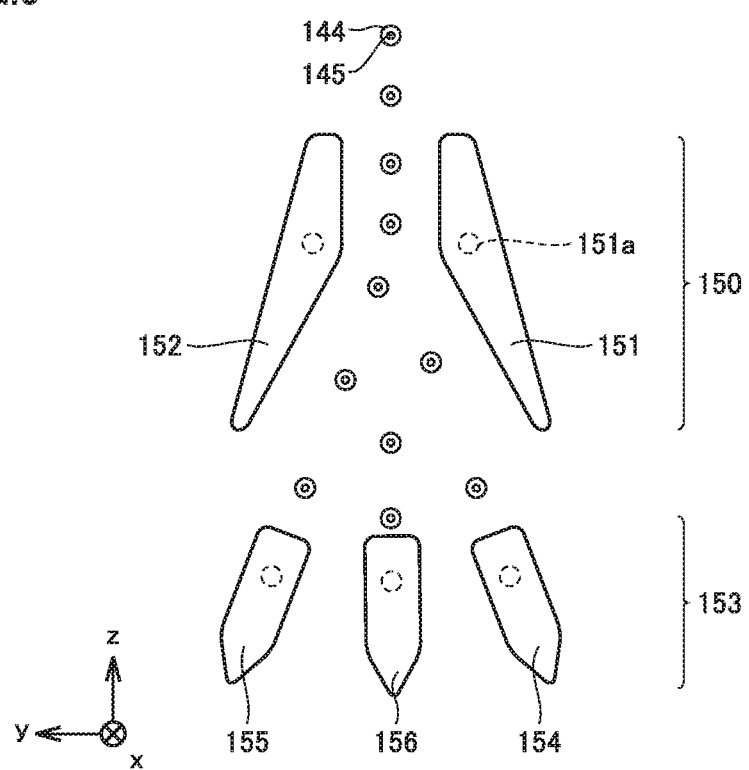
FIG. 9 is a schematic partial enlarged view of a sorting unit and a sample collection unit included in the particle sorting apparatus according to the first embodiment.

Particle sorting apparatus 30 mainly includes a flow chamber 40, a vibration electrode 60, a vibration element 74, a charge supply unit 76, a transparent window member 121, and a detection optical system 123, a sorting unit 150 (deflection plates 151, 152; see FIG. 9), a collection unit 153 (sample collection members 154, 155, and a waste liquid collection member 156; see FIG. 9), an alignment unit 80, a controller 170, and a housing 35. Flow chamber 40 includes a flow cell 90 and a chamber 41.

Housing 35 includes a separation wall 36. Separation wall 36 partitions an internal space of housing 35 into a first space 37 and a second space 38. First space 37 is fluidly isolated from second space 38 by separation wall 36. First space 37 is fluidly isolated from an external space by housing 35.

Flow chamber 40 (flow cell 90 and chamber 41) is contained in first space 37. Sorting unit 150 (deflection plates 151, 152) and collection unit 153 are contained in first space 37. In the present embodiment, first space 37 is a closed space and the inside of first space 37 is maintained to be in a hermetic state. The inside of first space 37 can be sterilized by vapor of hydrogen peroxide water or the like. Due to hitting or the like of droplets 144 against collection unit 153, aerosols are generated at a lower portion of first space 37 in which sorting unit 150 (deflection plates 151, 152) and collection unit 153 are located. The lower portion of first space 37 is contaminated by the aerosols. By sterilizing first space 37 by vapor of hydrogen peroxide water or the like, the contamination of the lower portion of first space 37 by the aerosols can be removed securely. A sterile state is secured in first space 37, and particles 145 included in the sample liquid can be sorted under the sterile environment.

Vibration element 74, detection optical system 123, alignment unit 80, and controller 170 are contained in second space 38.

A cavity 42 is provided inside chamber 41. Chamber 41 is provided with a first inlet 43 and a second inlet 44 each communicating with cavity 42. A first conduit 51 connected to a sample liquid source unit 50 is inserted in first inlet 43. Sample liquid source unit 50 stores a sample liquid including particles 145, and is disposed in first space 37. The sample liquid including particles 145 is supplied from sample liquid source unit 50 to cavity 42 of chamber 41 via first conduit 51.

A second conduit 53 connected to a sheath liquid source unit 52 is inserted in second inlet 44. Sheath liquid source unit 52 stores a sheath liquid, and is disposed external to housing 35 (first space 37). Second conduit 53 extends through housing 35. Since sheath liquid source unit 52 is disposed external to housing 35 (first space 37), bacteria may be introduced into the sheath liquid. In order to remove the bacteria, a filter 54 is provided in second conduit 53. The sheath liquid is supplied from sheath liquid source unit 52 to cavity 42 of chamber 41 via second conduit 53. The sample liquid is supplied into cavity 42 of chamber 41 filled with the sheath liquid. In this way, a sheath flow in which the sample liquid is enclosed with the sheath liquid is formed in cavity 42 of chamber 41.

Flow cell 90 is attached to chamber 41. Flow cell 90 may be detachably coupled to chamber 41. Flow cell 90 includes a flow cell body portion 91. Flow cell body portion 91 may be composed of a transparent inorganic material such as quartz, or may be composed of a transparent resin material.

Flow cell body portion 91 has a first end portion 92a, a second end portion 92b opposite to first end portion 92a, and an outer side surface 92s extending between first end portion 92a and second end portion 92b. First end portion 92a of flow cell body portion 91 is an end portion close to chamber 41. Second end portion 92b of flow cell body portion 91 is an end portion far away from chamber 41.

Figure 3:
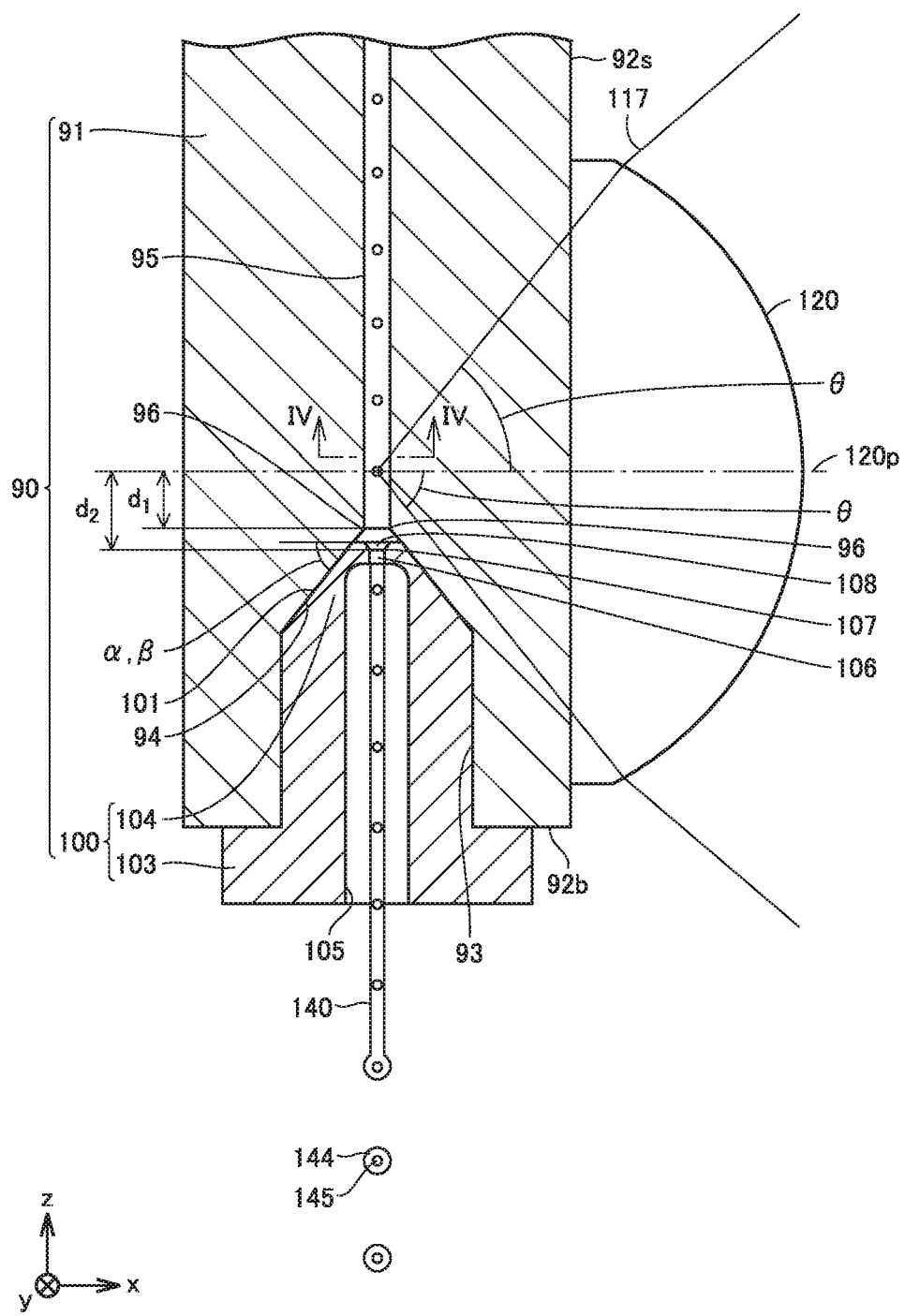
FIG. 3 is a schematic partial enlarged cross sectional view of a flow cell according to the first embodiment.

Flow cell body portion 91 is provided with a flow channel 95. Second end portion 92b of flow cell body portion 91 is provided with a nozzle receiving portion 93 communicating with flow channel 95. Flow channel 95 extends from first end portion 92a to nozzle receiving portion 93. Flow channel 95 communicates with cavity 42 of chamber 41. The sample liquid enclosed with the sheath liquid flows from cavity 42 into flow channel 95 of flow cell 90. As shown in FIG. 3, in flow channel 95, particles 145 included in the sample liquid are arranged in one line along the center axis of flow channel 95. Each of individual particles 145 is labeled with one or more types of labeling materials (for example, fluorophores), for example.

Figure 4:
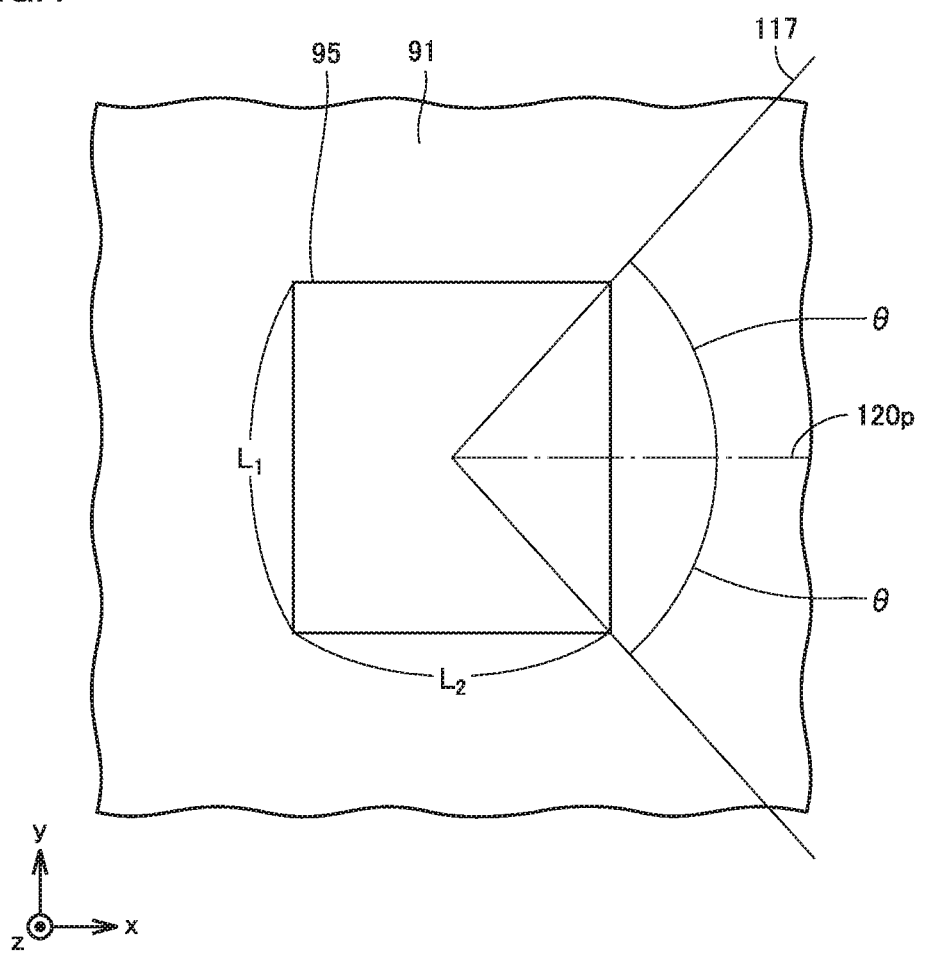
FIG. 4 is a schematic partial enlarged cross sectional view along a cross sectional line IV-IV shown in FIG. 3 in the flow cell according to the first embodiment.

As shown in FIG. 4, in flow cell 90, a first length $L_1$ of flow channel 95 in a third direction (y direction) is larger than a second length $L_2$ of flow channel 95 in a second direction (x direction). The second direction (x direction) is a direction in which an optical axis 120p of a convex lens 120 extends. The third direction (y direction) is perpendicular to the second direction (x direction) and a first direction (z direction) in which flow channel 95 extends. Therefore, an amount of light vignetted by flow channel 95 in light 117 emitted from particle 145 is decreased.

Flow cell 90 further includes convex lens 120. As shown in FIG. 3, convex lens 120 refracts light 117 emitted from particle 145 so as to reduce a spreading angle of light 117. Therefore, convex lens 120 can guide, to detection optical system 123, light 117 emitted in a wider angle range. Convex lens 120 may be composed of a transparent inorganic material such as quartz, or may be composed of a transparent resin material. Convex lens 120 may be composed of the same material as that of flow cell body portion 91, or may be composed of a material different from that of flow cell body portion 91.

Convex lens 120 is attached on a portion of outer side surface 92s of flow cell body portion 91 close to second end portion 92b (portion thereof far away from first end portion 92a). Therefore, nozzle channel 106 can be close to optical axis 120p of convex lens 120. A break-off point, at which a jet flow 140 is broken off into a droplet 144, can be close to optical axis 120p of convex lens 120, whereby identification information that characterizes particle 145 can be detected at a position closer to the break-off point. Particle 145 can be sorted with improved sorting precision. It should be noted that in the present specification, the portion close to second end portion 92b refers to a portion of outer side surface 92s of flow cell body portion 91 at the second end portion 92b side relative to an intermediate line between first end portion 92a and second end portion 92b.

In a cross section defined by the first direction (z direction) in which flow channel 95 extends and the second direction (x direction) in which optical axis 120p extends, a first distance $d_1$ (see FIG. 3) between optical axis 120p of convex lens 120 and end portion 96 of flow channel 95 close to nozzle receiving portion 93 is less than or equal to 2.0 mm, for example. First distance $d_1$ may be less than or equal to 1.5 mm, or may be less than or equal to 1.0 mm. Nozzle channel 106 may be disposed close to optical axis 120p of convex lens 120. The break-off point at which jet flow 140 is broken off into droplet 144 can be close to optical axis 120p of convex lens 120, whereby the identification information that characterizes particle 145 can be detected at a position closer to the break-off point. Particle 145 can be sorted with improved sorting precision.

Convex lens 120 is directly attached to outer side surface 92s of flow cell body portion 91. Therefore, a distance between convex lens 120 and the surface of flow channel 95 is decreased. Convex lens 120 can guide, to detection optical system 123, light 117 emitted in a wider angle range. The identification information that characterizes the particle can be detected with improved sensitivity. In the present specification, such a fact that convex lens 120 is directly attached to outer side surface 92s of flow cell body portion 91 means that transparent window member 121 and another optical member such as a lens are not disposed between convex lens 120 and flow cell body portion 91. For example, convex lens 120 is welded to outer side surface 92s of flow cell body portion 91. Convex lens 120 may be formed in one piece with flow cell body portion 91. Convex lens 120 may be adhered to outer side surface 92s of flow cell body portion 91 using a transparent adhesive agent, for example.

Convex lens 120 has a numerical aperture NA of more than or equal to 0.80, for example. Numerical aperture NA of convex lens 120 may be more than or equal to 0.90, or may be more than or equal to 1.00. Therefore, convex lens 120 can guide, to detection optical system 123, light 117 emitted in a wider angle range. The identification information that characterizes the particle can be detected with improved sensitivity. It should be noted that in the present specification, numerical aperture NA of convex lens 120 is given by a product of a refractive index n of flow cell body portion 91 and sin θ. A first angle θ is a maximum angle between optical axis 120p of convex lens 120 and light 117 within flow cell body portion 91 to be guided to detection optical system 123 by convex lens 120, in the cross section defined by the first direction (z direction) in which flow channel 95 extends and the second direction (x direction) in which optical axis 120p extends. In other words, first angle θ is a maximum angle between optical axis 120p of convex lens 120 and light 117 within flow cell body portion 91 to be caught by convex lens 120, in the cross section defined by the first direction (z direction) in which flow channel 95 extends and the second direction (x direction) in which optical axis 120p extends. First angle θ is given by $\sin^{-1}$ (NA/n).

Figure 7:
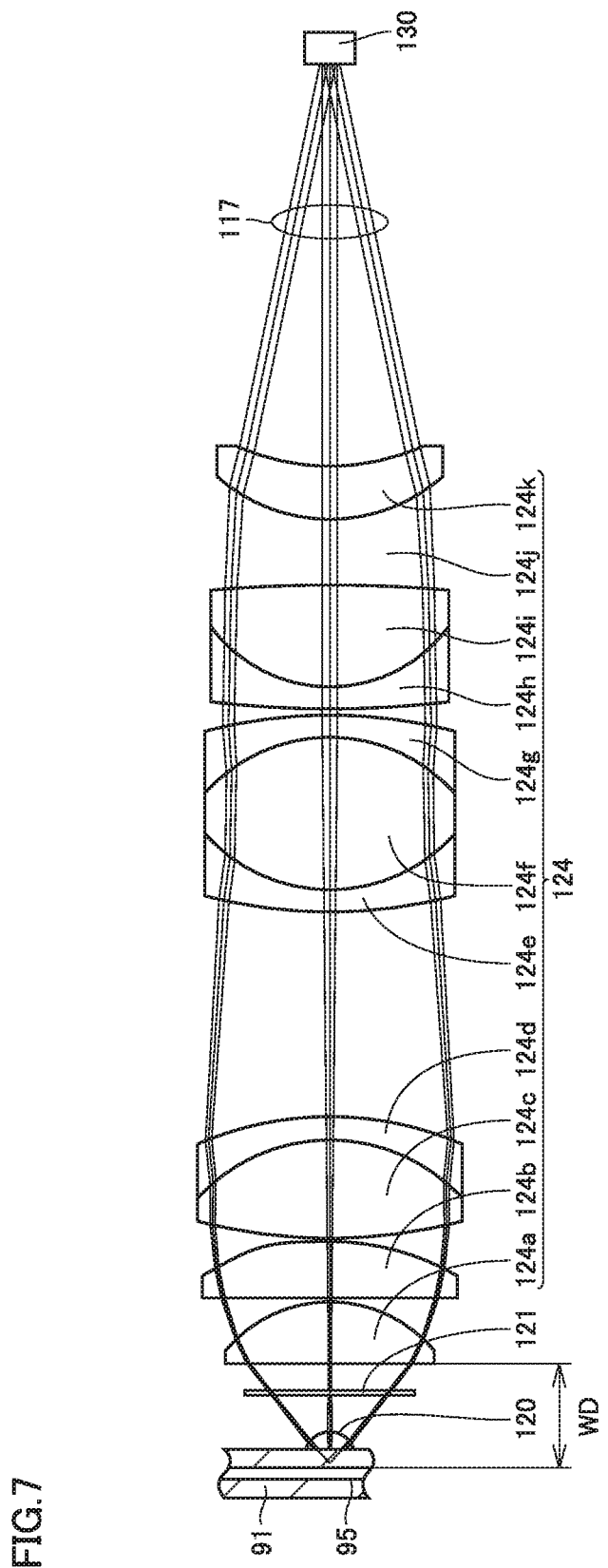
FIG. 7 is a schematic partial enlarged view of a detection optical system included in the particle sorting apparatus according to the first embodiment.

Convex lens 120 can have a long working distance WD (see FIG. 7). Working distance WD is more than or equal to 10 mm, for example. Therefore, even when transparent window member 121 is disposed between convex lens 120 and detection optical system 123, detection optical system 123 can be readily incorporated into particle sorting apparatus 30 without transparent window member 121 mechanically interfering with detection optical system 123. It should be noted that working distance WD is defined as a distance on the optical axis of detection optical system 123 (optical axis 120p of convex lens 120) between the surface of flow channel 95 and a surface, at the side close to flow cell 90, of a lens 124a disposed closest to flow cell 90 in detection side lens optical system 124.

Nozzle receiving portion 93 is located at the side close to second end portion 92b relative to optical axis 120p of convex lens 120. Nozzle receiving portion 93 is tapered toward flow channel 95. Therefore, an amount of light vignetted by tapered surface 94 (nozzle 100) of nozzle receiving portion 93 in light 117 emitted from particle 145 is decreased. The identification information that characterizes the particle can be detected with improved sensitivity. An second angle α between tapered surface 94 of nozzle receiving portion 93 and optical axis 120p is more than or equal to 30° in the cross section defined by the first direction (z direction) in which flow channel 95 extends and the second direction (x direction) in which optical axis 120p extends. Second angle α may be more than or equal to 35° or may be more than or equal to 40°. Second angle α may be less than or equal to 70° or may be less than or equal to 60°. Specifically, flow cell 90 avoids light 117 from being vignetted by tapered surface 94 (nozzle 100) of nozzle receiving portion 93. For example, second angle α is more than or equal to first angle θ. Hence, the identification information that characterizes the particle can be detected with improved sensitivity.

In a plan view in the second direction (x direction) in which optical axis 120p of convex lens 120 extends, nozzle receiving portion 93 overlaps with a portion of convex lens 120. Therefore, nozzle channel 106 can be close to optical axis 120p of convex lens 120. The break-off point at which jet flow 140 is broken off into droplet 144 can be close to optical axis 120p of convex lens 120, whereby the identification information that characterizes particle 145 can be detected at a position closer to the break-off point. Particle 145 can be sorted with improved sorting precision.

Figure 5:
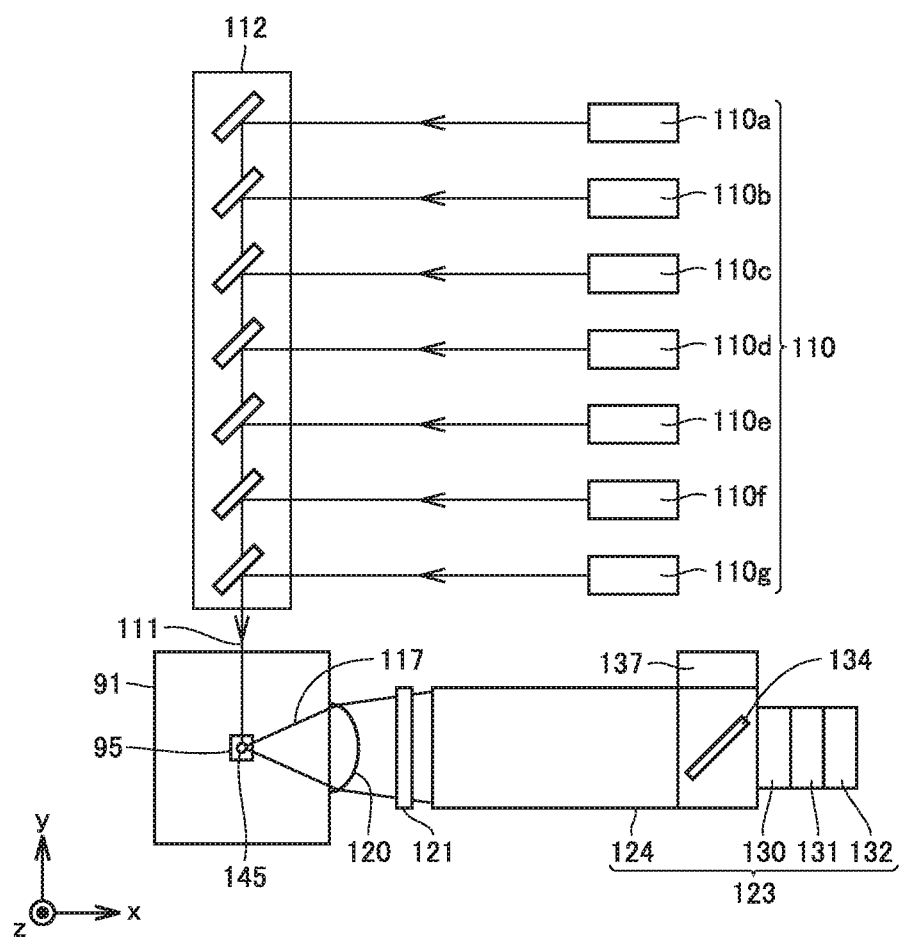
FIG. 5 is a schematic view showing an optical system of the particle sorting apparatus according to the first embodiment.
Figure 6:
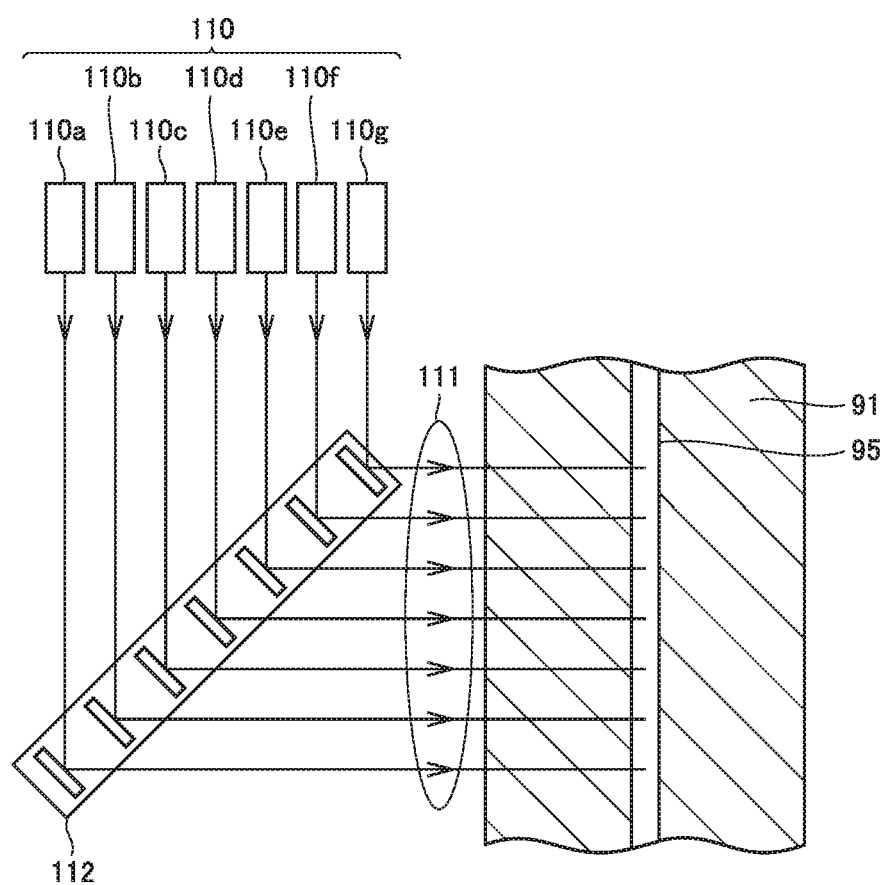
FIG. 6 is a schematic partial enlarged view showing the optical system of the particle sorting apparatus according to the first embodiment.

As shown in FIG. 5, each of particles 145 arranged in one line within flow channel 95 is irradiated with excitation light 111 from light source unit 110. Excitation light 111 includes light having one or more wavelengths. In the present embodiment, excitation light 111 includes light having a plurality of wavelengths. As shown in FIG. 5 and FIG. 6, light source unit 110 includes laser units 110a, 110b, 110c, 110d, 110e, 110f, 110g, for example. The wavelengths of beams of the laser light emitted from laser units 110a, 110b, 110c, 110d, 110e, 110f, 110g are different from one another. With excitation light 111 including the light having the plurality of wavelengths, a plurality of pieces of identification information of each particle 145 can be obtained at one time. Particle 145 can be sorted efficiently.

As shown in FIG. 5 and FIG. 6, each of particles 145 flowing in flow channel 95 is irradiated with excitation light 111 emitted from light source unit 110 via an optical path conversion unit 112. Optical path conversion unit 112 is a reflective mirror, for example. Light 117 is emitted from particle 145. An incident optical system including light source unit 110 and optical path conversion unit 112 is fixed to housing 35.

Transparent window member 121 is hermetically fitted in an opening 36b of separation wall 36, and is fixed to housing 35 (separation wall 36). Transparent window member 121 faces convex lens 120. Transparent window member 121 is disposed between convex lens 120 and detection optical system 123. Transparent window member 121 fluidly separates detection optical system 123 from first space 37. Accordingly, transparent window member 121 can prevent detection optical system 123 from being contaminated by aerosols generated in first space 37 due to hitting or the like of droplets 144 against collection unit 153. Moreover, also when a sterilization gas is supplied to first space 37 to sterilize first space 37, detection optical system 123 is prevented from being exposed to the sterilization gas. Accordingly, detection optical system 123 is prevented from being damaged by the gas.

Detection optical system 123 is optically coupled to convex lens 120. Light 117 emitted from particle 145 passes through convex lens 120 and transparent window member 121, and enters detection optical system 123. Detection optical system 123 may be fixed to housing 35 (separation wall 36). Detection side lens optical system 124 is disposed at the side far away from convex lens 120 relative to transparent window member 121. Detection optical system 123 includes detection side lens optical system 124. Detection side lens optical system 124 is constituted of one or more lenses. As shown in FIG. 7, in the present embodiment, detection side lens optical system 124 is constituted of a plurality of lenses 124a, 124b, 124c, 124d, 124e, 124f, 124g, 124h, 124i, 124j, 124k. Detection side lens optical system 124 images light 117 emitted from particle 145, on an incident surface of an optical fiber array 130 with low chromatic aberration and low image aberration.

Figure 8:
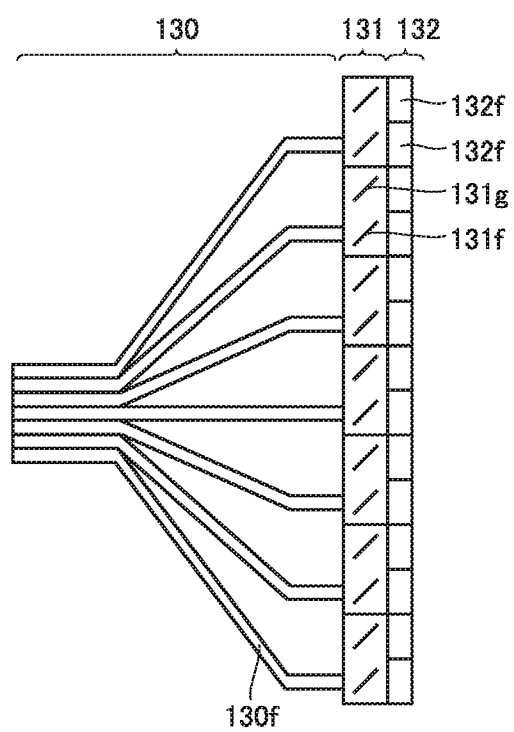
FIG. 8 is a schematic partial enlarged view of the detection optical system included in the particle sorting apparatus according to the first embodiment.

As shown in FIG. 1, FIG. 5, and FIG. 8, detection optical system 123 further includes an optical fiber array 130 and a light detection unit 132. Optical fiber array 130 is disposed between detection side lens optical system 124 and light detection unit 132. A plurality of optical fibers 130f included in optical fiber array 130 are disposed to correspond to the plurality of respective laser units 110a, 110b, 110c, 110d, 110e, 110f, 110g. Optical fiber array 130 transmits light 117 to light detection unit 132.

Light detection unit 132 includes a plurality of light detectors 132f. The plurality of light detectors 132f are photomultiplier tubes, for example. Detection optical system 123 may further include a wavelength division unit 131 (not shown). Wavelength division unit 131 is disposed between optical fiber array 130 and light detection unit 132 to divide light 117. Wavelength division unit 131 includes a wavelength filter 131f and a reflective mirror 131g.

Vibration electrode 60 extends from cavity 42 of chamber 41 to outside of chamber 41. Vibration electrode 60 includes a vibration electrode portion 61 and an electrically conductive portion 65. Electrically conductive portion 65 is inserted in an opening 36a of separation wall 36. Electrically conductive portion 65 extends from second space 38 to first space 37 through opening 36a of separation wall 36. Specifically, electrically conductive portion 65 is received in an insulation sleeve 70. Insulation sleeve 70 is inserted in a hole of a sealing member 72. Sealing member 72 is inserted in opening 36a of separation wall 36. Sealing member 72 is an elastic seal such as a rubber seal, for example. Sealing member 72 can be deformed elastically.

Flow chamber 40 includes vibration electrode portion 61. Vibration electrode portion 61 is provided in chamber 41. Vibration electrode portion 61 extends from cavity 42 of chamber 41 to the outside of chamber 41. Vibration electrode portion 61 is provided on a side surface of chamber 41 facing separation wall 36. Vibration electrode portion 61 includes a first flange portion 62 and a first shank portion 63 extending from first flange portion 62. First flange portion 62 is provided on the side surface of chamber 41 facing separation wall 36. First shank portion 63 extends from the side surface of chamber 41 to cavity 42 of chamber 41. An end surface 63a of first shank portion 63 is exposed to cavity 42 of chamber 41. End surface 63a of first shank portion 63 is smoothly continuous to a surface 46 defined by cavity 42 of chamber 41. Accordingly, the flow of the sheath liquid and the sample liquid in cavity 42 of chamber 41 can be prevented from being disturbed by end surface 63a of vibration electrode portion 61. Vibration electrode portion 61 includes a plurality of protrusions 64. The plurality of protrusions 64 are provided at first flange portion 62.

Electrically conductive portion 65 includes a second flange portion 66 and a second shank portion 67 extending from second flange portion 66. Second flange portion 66 faces first flange portion 62. A plurality of recesses 68 are formed in electrically conductive portion 65. The plurality of recesses 68 are formed in second flange portion 66. The plurality of protrusions 64 are fitted in the plurality of recesses 68, thereby electrically and mechanically connecting vibration electrode portion 61 to electrically conductive portion 65. Vibration electrode portion 61 can be stably positioned relative to electrically conductive portion 65. The plurality of protrusions 64 and the plurality of recesses 68 function as a positioning mechanism that defines a position of vibration electrode portion 61 relative to electrically conductive portion 65. As the positioning mechanism, the plurality of recesses 68 may be formed in vibration electrode portion 61, and the plurality of protrusions 64 may be formed in electrically conductive portion 65, for example. In order to improve electric connectivity between vibration electrode portion 61 and electrically conductive portion 65, a metal layer (for example, a nickel plating layer) may be formed at a connection portion between vibration electrode portion 61 and electrically conductive portion 65.

Figure 2:
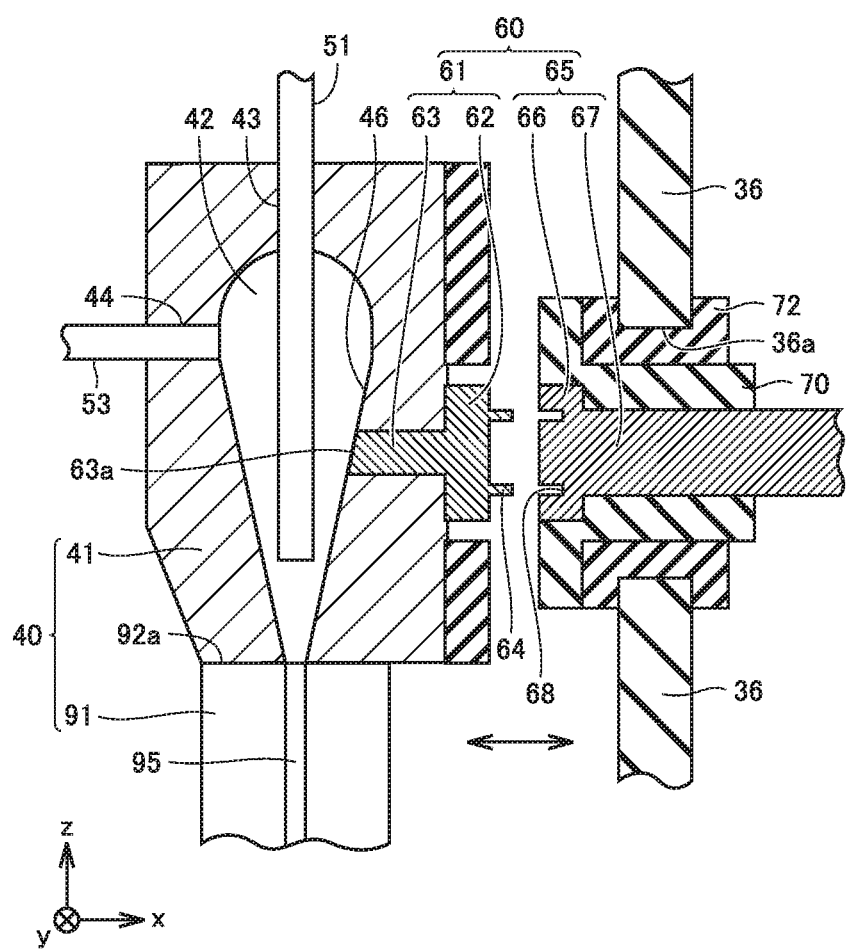
FIG. 2 is a schematic partial enlarged cross sectional view of the particle sorting apparatus according to the first embodiment.

As shown in FIG. 2, vibration electrode portion 61 is detachably connected to electrically conductive portion 65. Hence, flow chamber 40 (or chamber 41) can be attached to and detached from housing 35 (separation wall 36). Used flow chamber 40 (or chamber 41) may be exchanged with a flow chamber 40 (or chamber 41) sterilized by applying radiation or heat thereto. Particles 145 can be sorted in the sterile state at low cost.

Vibration element 74 is connected to vibration electrode 60. Specifically, vibration element 74 is coupled to electrically conductive portion 65. Vibration element 74 has a ring-like shape, and electrically conductive portion 65 is inserted in the hole of vibration element 74. Ultrasonic vibrations applied from vibration element 74 to electrically conductive portion 65 are transmitted to vibration electrode portion 61, and are further transmitted to the sheath flow in cavity 42 of chamber 41 as well as jet flow 140. Vibration electrode portion 61 transmits ultrasonic vibrations to the sheath liquid and sample liquid in cavity 42 of chamber 41 as well as jet flow 140. Vibration element 74 is a piezoelectric element, for example.

Electrically conductive portion 65 is connected to charge supply unit 76. Charge supply unit 76 supplies charges to electrically conductive portion 65. The charges supplied to electrically conductive portion 65 are supplied, via vibration electrode portion 61, to the sheath flow in cavity 42 of chamber 41 and jet flow 140. Vibration electrode portion 61 supplies charges to the sheath liquid and sample liquid in cavity 42 of chamber 41 as well as jet flow 140. The charges are supplied to droplet 144 including particle 145 so as to sort droplet 144 in sorting unit 150.

With vibration electrode 60, charges and ultrasonic vibrations can be supplied to the sheath flow in cavity 42 of chamber 41 and jet flow 140 without a connector of an electric wiring being exposed to first space 37 in which chamber 41 is disposed. Therefore, the connector of vibration electrode portion 61 can be prevented from being damaged by sterilization gas when sterilizing first space 37 using the sterilization gas in order to remove contamination resulting from aerosols of the sample liquid. First space 37 can be readily sterilized using the sterilization gas.

As shown in FIG. 1 and FIG. 3, flow cell 90 further includes nozzle 100. Nozzle 100 may be composed of the same material as that of flow cell body portion 91, or may be composed of a material different from that of flow cell body portion 91. In the present embodiment, flow cell body portion 91 is composed of quartz, whereas nozzle 100 is composed of a metal material. With nozzle 100 being composed of the metal material, cost of nozzle 100 can be decreased.

Nozzle 100 includes a third end portion 104 having a tapered shape. Third end portion 104 of nozzle 100 is provided with a nozzle channel 106 communicating with flow channel 95. Since third end portion 104 has a tapered shape, an amount of light vignetted by nozzle 100 in light 117 emitted from particle 145 is decreased. Third end portion 104 is received in nozzle receiving portion 93. Accordingly, nozzle channel 106 can be close to optical axis 120$p$ of convex lens 120. The break-off point at which jet flow 140 is broken off into droplet 144 can be close to optical axis 120$p$ of convex lens 120, whereby the identification information that characterizes particle 145 can be detected at a position closer to the break-off point. Particle 145 can be sorted with improved sorting precision. Third end portion 104 is located at the side close to second end portion 92$b$ relative to optical axis 120$p$ of convex lens 120.

A third angle $\beta$ is equal to second angle $\alpha$. Third angle $\beta$ is an angle between tapered surface 101 of nozzle 100 and optical axis 120$p$ in the cross section defined by the first direction (z direction) in which flow channel 95 extends and the second direction (x direction) in which optical axis 120$p$ extends. Hence, tapered surface 101 of nozzle 100 makes surface contact with tapered surface 94 of nozzle receiving portion 93. Nozzle 100 is self-aligned with flow channel 95 to align nozzle channel 106 with flow channel 95. Particle 145 can be sorted with improved sorting precision.

Third angle $\beta$ is more than or equal to 30° in the cross section defined by the first direction (z direction) in which flow channel 95 extends and the second direction (x direction) in which optical axis 120$p$ extends. Third angle $\beta$ may be more than or equal to 35° or may be more than or equal to 40°. Third angle $\beta$ may be less than or equal to 70° or may be less than or equal to 60°. Specifically, nozzle 100 avoids light 117 from being vignetted by nozzle 100. For example, third angle $\beta$ is more than or equal to first angle $\theta$. Therefore, the identification information that characterizes the particle can be detected with improved sensitivity.

Jet flow 140 in which the sample liquid is enclosed with the sheath liquid is sent out from nozzle channel 106. Jet flow 140 is sent out from nozzle channel 106 having a cross sectional area smaller than that of flow channel 95, and vibrations generated in vibration element 74 are transmitted to jet flow 140. Accordingly, jet flow 140 is broken off into droplet 144 at the break-off point, which is a lower end portion of jet flow 140.

In the cross section defined by the first direction (z direction) in which flow channel 95 extends and the second direction (x direction) in which optical axis 120$p$ of convex lens 120 extends, a second distance $d_2$ (see FIG. 3) between optical axis 120$p$ of convex lens 120 and an end portion 107 of nozzle channel 106 close to flow channel 95 is determined by: the numerical aperture (NA) of convex lens 120; the magnification of the convex lens; and a center interval between two optical fibers 130$f$ adjacent to each other in optical fiber array 130. Second distance $d_2$ is equal to first distance $d_1$, or is larger than first distance $d_1$. Second distance $d_2$ is less than or equal to 2.0 mm, for example. Second distance $d_2$ may be less than or equal to 1.5 mm, or may be less than or equal to 1.0 mm. Nozzle channel 106 is disposed close to optical axis 120$p$ of convex lens 120. The break-off point at which jet flow 140 is broken off into droplet 144 can be close to optical axis 120$p$ of convex lens 120, whereby the identification information that characterizes particle 145 can be detected at a position closer to the break-off point. Particle 145 can be sorted with improved sorting precision.

Nozzle 100 may be provided with a tapered channel 108 communicating with flow channel 95 and nozzle channel 106. Tapered channel 108 is provided at the side close to flow channel 95 relative to nozzle channel 106, and is connected to nozzle channel 106. Tapered channel 108 has a tapered shape toward nozzle channel 106. The cross-sectional area of tapered channel 108 is decreased gradually toward nozzle channel 106. Accordingly, when the sheath flow having flown out of flow channel 95 flows into nozzle channel 106, occurrence of a turbulent flow is suppressed in the sheath flow. The position of the sample liquid in the sheath flow can be suppressed from being displaced. Hence, particle 145 can be sorted with improved sorting precision.

The end portion of tapered channel 108 close to flow channel 95 has the same cross sectional area as that of flow channel 95, for example. The end portion of tapered channel 108 close to nozzle channel 106 has the same cross sectional area as that of nozzle channel 106, for example. The cross sectional area of nozzle channel 106 is an area of nozzle channel 106 in a cross section perpendicular to the direction (z direction) in which nozzle channel 106 extends. The cross sectional area of tapered channel 108 is an area of tapered channel 108 in the cross section perpendicular to the direction (z direction) in which tapered channel 108 extends.

A nozzle cavity portion 105 communicating with nozzle channel 106 is provided in nozzle 100. Nozzle cavity portion 105 has a larger cross sectional area than those of nozzle channel 106 and flow channel 95. The cross sectional area of nozzle cavity portion 105 is an area of nozzle cavity portion 105 in the cross section perpendicular to the direction (z direction) in which nozzle cavity portion 105 extends. Jet flow 140 is sent out to the outside of nozzle 100 through nozzle cavity portion 105. Nozzle 100 includes a flange portion 103 that is in contact with second end portion 92b of flow cell body portion 91.

As shown in FIG. 9, sorting unit 150 includes a pair of deflection plates 151, 152. Deflection plates 151, 152 have basically the same configuration. With deflection plate 151 being assumed as a representative example, the configuration of deflection plate 151 will be described. An extension portion 151a extending toward separation wall 36 is formed in deflection plate 151. A connector 160 is hermetically fitted in opening 36c of separation wall 36. An opening 161 is formed in connector 160. Extension portion 151a is inserted in opening 161. Deflection plate 151 may be attachable to and detachable from connector 160. An 0 ring 162 serving as a sealing member is disposed between extension portion 151a and the inner wall of opening 161. Extension portion 151a is connected to controller 170 via a wiring.

By applying voltage between deflection plates 151, 152, an electric field is formed between deflection plates 151, 152. Charges corresponding to the identification information of each particle 145 detected by light detection unit 132 is supplied from vibration electrode portion 61 to droplet 144 via the sheath flow in cavity 42 of chamber 41 and jet flow 140. Droplet 144 is fed with force by the electric field between deflection plates 151, 152. Depending on the charges supplied to droplet 144, a falling direction of droplet 144 is changed.

As shown in FIG. 9, collection unit 153 includes the plurality of sample collection members 154, 155 and waste liquid collection member 156. Sample collection members 154, 155 are attached to housing 35 (separation wall 36). Sample collection members 154, 155 may be detachably attached to housing 35 (separation wall 36). Droplets 144 having falling directions changed in sorting unit 150 are caught in corresponding sample collection members 154, 155. In this way, particle 145 included in each droplet 144 can be sorted in accordance with the identification information thereof. An unnecessary droplet 144 is caught in waste liquid collection member 156.

With reference to FIG. 1, alignment unit 80 aligns flow channel 95 with detection side lens optical system 124. Alignment unit 80 is, for example, a triple-axis moving mechanism, and moves flow channel 95 in the first direction (z direction), the second direction (x direction), and the third direction (y direction). Alignment unit 80 is attached to separation wall 36 via a fixing portion 79. Alignment unit 80 is coupled to vibration electrode 60 (electrically conductive portion 65) via a movable member 78. Vibration electrode 60 (electrically conductive portion 65) can be moved in a range (for example, an elastic deformation amount of ±1.0 mm) in which sealing member 72 can be deformed elastically. Alignment unit 80 moves movable member 78 and vibration electrode 60 to move flow chamber 40 (chamber 41).

As shown in FIG. 1 and FIG. 5, particle sorting apparatus 30 further includes an imaging unit 137 and a reflective member 134. Reflective member 134 is a half mirror, for example. Reflective member 134 is disposed between detection side lens optical system 124 and optical fiber array 130. Reflective member 134 reflects at least part of light 117 emitted from particle 145, toward imaging unit 137. An image of flow channel 95 and an image of light 117 emitted from particle 145 are obtained by imaging unit 137. Data of these images obtained by imaging unit 137 is output to controller 170.

Based on the data of the images output from imaging unit 137, controller 170 controls alignment unit 80. For example, controller 170 controls alignment unit 80 to attain maximum intensity of light 117 emitted from particle 145. Alignment unit 80 moves flow chamber 40 using movable member 78 and vibration electrode 60. In this way, flow channel 95 is aligned with the incident optical system and detection optical system 123 (detection side lens optical system 124). Whenever flow chamber 40 is attached to particle sorting apparatus 30, flow channel 95 is aligned with the optical axis of excitation light 111 and the optical axis of detection optical system 123 (optical axis 120p of convex lens 120) using alignment unit 80. Accordingly, high particle detection sensitivity of particle sorting apparatus 30 can be maintained.

Particle sorting apparatus 30 may further include a reflective member driving unit 135 that moves reflective member 134. When aligning flow chamber 40 with detection optical system 123, reflective member driving unit 135 positions reflective member 134 on the optical axis of detection optical system 123 (optical axis 120p of convex lens 120). When detecting the specific identification information that characterizes each particle 145 by detecting light 117 emitted from particle 145, reflective member driving unit 135 retreats reflective member 134 from the optical axis of detection optical system 123 (optical axis 120p of convex lens 120). Accordingly, when detecting the specific identification information that characterizes each particle 145 by detecting light 117 emitted from particle 145, part of light 117 emitted from particle 145 is prevented from failing to reach light detection unit 132 due to reflective member 134. The particle detection sensitivity of particle sorting apparatus 30 is prevented from being decreased.

Controller 170 is electrically connected to vibration element 74, charge supply unit 76, alignment unit 80, light detection unit 132, reflective member driving unit 135, imaging unit 137, and deflection plates 151, 152. Controller 170 controls vibration element 74 to control on/off, frequency, and the like of ultrasonic vibrations to be applied from vibration element 74 to vibration electrode 60. Controller 170 controls alignment unit 80 to control movement direction and movement distance of flow chamber 40.

Controller 170 controls charge supply unit 76. Specifically, controller 170 receives the identification information of each particle 145 detected by light detection unit 132, and controls, in accordance with this identification information, polarity and amount of charges to be supplied from charge supply unit 76 to vibration electrode 60. Controller 170 controls reflective member driving unit 135. Controller 170 receives the data of the image of flow channel 95 and the data of the image of light 117 emitted from particle 145, both of which are obtained by imaging unit 137, and controls alignment unit 80 based on the data of these images. Controller 170 controls the electric field applied between deflection plates 151, 152.

Figure 10:
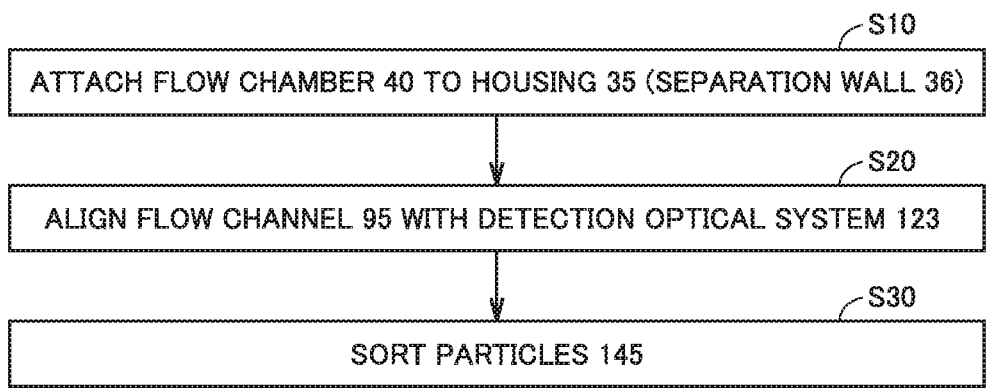
FIG. 10 shows a flowchart of a method for sorting particles according to the first embodiment.
Figure 11:
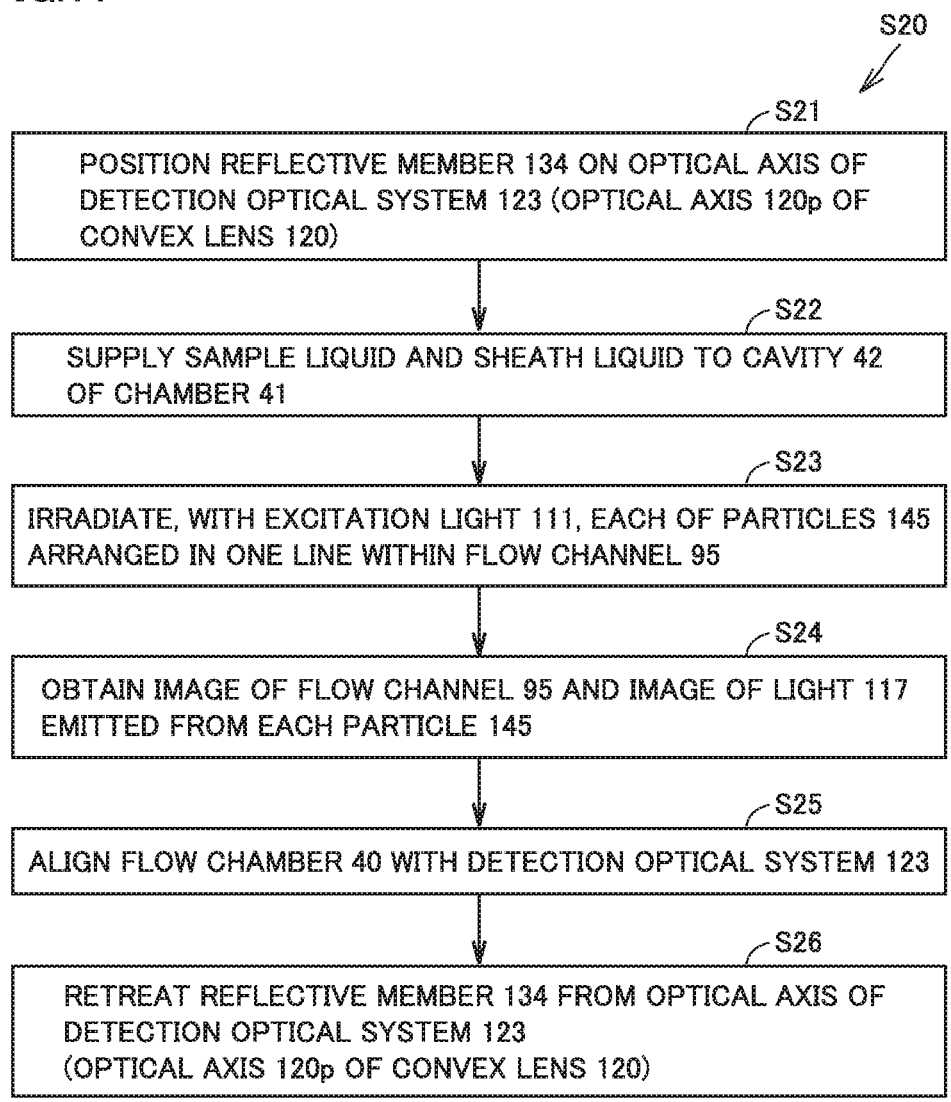
FIG. 11 shows a flowchart of a step of aligning a flow channel with a detection side lens optical system in the method for sorting the particles according to the first embodiment.
Figure 12:
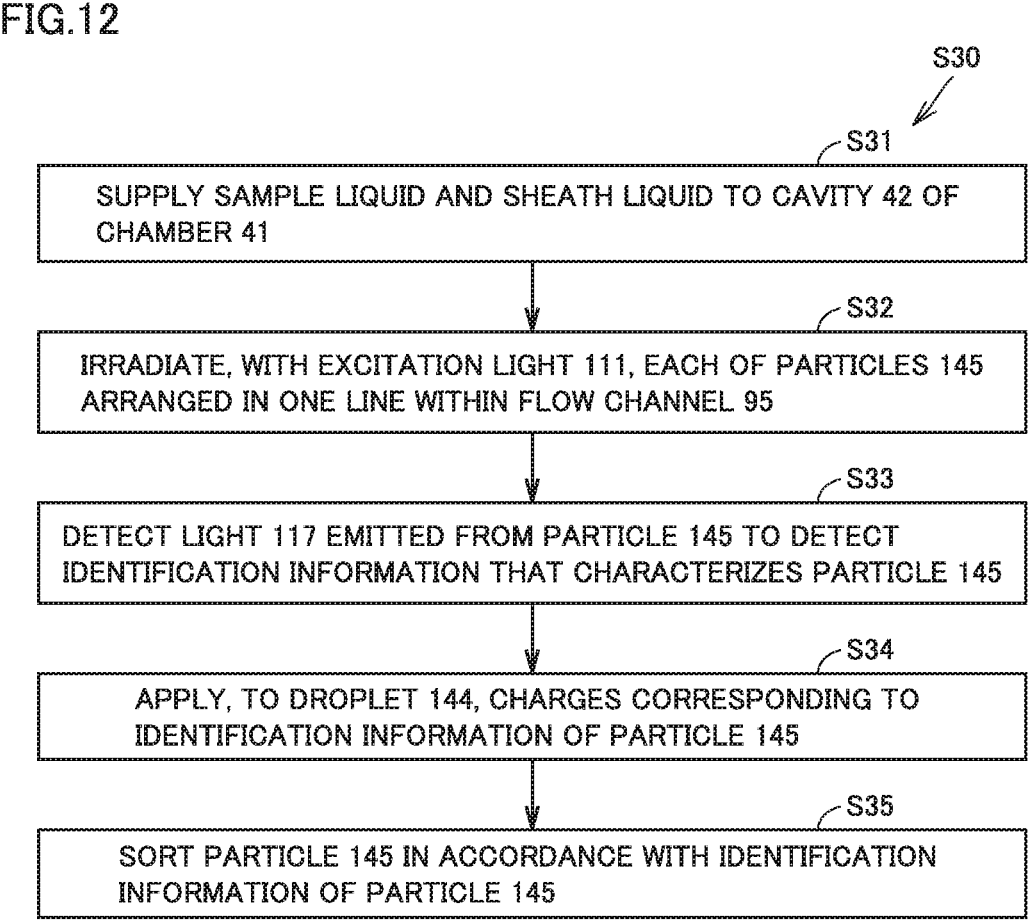
FIG. 12 shows a flowchart of a step of sorting the particles in the method for sorting the particles according to the first embodiment.

With reference to FIG. 10 to FIG. 12, a method for sorting particles using particle sorting apparatus 30 will be described.

With reference to FIG. 10, the method for sorting the particles according to the present embodiment includes attaching flow chamber 40 to housing 35 (separation wall 36) (S10). Specifically, flow chamber 40, first conduit 51, and second conduit 53 are sterilized by applying radiation or heat to flow chamber 40, first conduit 51, and second conduit 53. First conduit 51 is inserted into first inlet 43 of chamber 41, and second conduit 53 is inserted into second inlet 44 of chamber 41. Flow chamber 40 is attached to separation wall 36 of housing 35. Specifically, vibration electrode portion 61 is attached to electrically conductive portion 65 fixed to housing 35 (separation wall 36). The plurality of protrusions 64 of vibration electrode portion 61 are fitted in the plurality of recesses 68 of electrically conductive portion 65. Vibration electrode portion 61 is positioned relative to electrically conductive portion 65.

With reference to FIG. 10, the method for sorting the particles according to the present embodiment includes aligning flow channel 95 with detection optical system 123 (S20). That is, flow chamber 40 is aligned with detection optical system 123 using alignment unit 80.

With reference to FIG. 11, reflective member driving unit 135 is used to position reflective member 134 on the optical axis of detection optical system 123 (optical axis 120p of convex lens 120) (S21). The sample liquid and the sheath liquid are supplied to cavity 42 of chamber 41 (S22). Specifically, the sheath liquid is supplied from sheath liquid source unit 52 to cavity 42 of chamber 41 through second conduit 53. Cavity 42 of chamber 41 is filled with the sheath liquid. Then, the sample liquid is supplied from sample liquid source unit 50 to cavity 42 of chamber 41 through first conduit 51. In cavity 42 of chamber 41, the sheath flow in which the sample liquid is enclosed with the sheath liquid is formed. The sheath flow flows from cavity 42 of chamber 41 into flow channel 95 of flow cell 90. In flow channel 95, particles 145 included in the sample liquid are arranged in one line along the center axis of flow channel 95. Each of individual particles 145 is labeled with one or more types of label materials (for example, fluorophores), for example.

Each of individual particles 145 arranged in one line within flow channel 95 is irradiated with excitation light 111 using light source unit 110 (S23). Light 117 is emitted from particle 145. Light 117 emitted from particle 145 enters reflective member 134 via convex lens 120, transparent window member 121, and detection side lens optical system 124. At least part of light 117 is reflected by reflective member 134, and enters imaging unit 137. Imaging unit 137 is used to obtain the image of flow channel 95 and the image of light 117 emitted from particle 145 (S24). Imaging unit 137 outputs the data of these images to controller 170.

Based on the data of the images obtained by imaging unit 137, flow chamber 40 is aligned with detection optical system 123 (S25). Based on the data of the images output from imaging unit 137, controller 170 controls alignment unit 80. The incident optical system including light source unit 110 and optical path conversion unit 112 and detection optical system 123 are fixed to housing 35 (separation wall 36). Controller 170 controls alignment unit 80 to attain maximum intensity of light 117 emitted from particle 145. Alignment unit 80 moves flow chamber 40 using movable member 78 and vibration electrode 60. In this way, flow channel 95 is aligned with the incident optical system and detection optical system 123 (detection side lens optical system 124). Then, reflective member driving unit 135 is used to retreat reflective member 134 from the optical axis of detection optical system 123 (optical axis 120p of convex lens 120) (S26).

With reference to FIG. 10, the method for sorting particles according to the present embodiment includes sorting particles 145 (S30). With reference to FIG. 12, specifically, the sample liquid and the sheath liquid are supplied to cavity 42 of chamber 41 (S31). In cavity 42 of chamber 41, the sheath flow in which the sample liquid is enclosed with the sheath liquid is formed. The sheath flow flows from cavity 42 of chamber 41 into flow channel 95 of flow cell 90. In flow channel 95, individual particles 145 included in the sample liquid are arranged in one line along the center axis of flow channel 95. Each of individual particles 145 is labeled with one or more types of label materials (for example, fluorophores), for example.

Each of individual particles 145 arranged in one line within flow channel 95 is irradiated with excitation light 111 using light source unit 110 (S32). Light 117 is emitted from particle 145. Light 117 emitted from particle 145 enters optical fiber array 130 via convex lens 120, transparent window member 121, and detection side lens optical system 124. Light 117 emitted from particle 145 is imaged on an incident surface of an optical fiber array 130. Optical fiber array 130 transmits light 117 emitted from particle 145, to light detection unit 132. Light 117 emitted from particle 145 is detected by light detection unit 132, thereby detecting the identification information that characterizes particle 145 (S33). Light 117 emitted from particle 145 may be divided by wavelength division unit 131 before being detected by light detection unit 132.

Charges corresponding to the identification information of particle 145 detected by light detection unit 132 are supplied to droplet 144 (S34). Specifically, the charges corresponding to the identification information of particle 145 detected by light detection unit 132 are supplied from vibration electrode portion 61 to droplet 144 via the sheath flow in cavity 42 of chamber 41 and jet flow 140. No charges are supplied to an unnecessary droplet 144.

Particle 145 is sorted in accordance with the identification information of particle 145 (S35). Specifically, voltage is applied between deflection plates 151, 152 to form an electric field between deflection plates 151, 152. Droplet 144 is fed with force by this electric field. Depending on the charges supplied to droplet 144, a falling direction of droplet 144 is changed. Droplets 144 having falling directions changed are caught in corresponding sample collection members 154, 155. In this way, particle 145 included in each droplet 144 can be sorted in accordance with the identification information of particle 145. An unnecessary droplet 144 is caught in waste liquid collection member 156.

The following describes effects of flow cell 90, flow chamber 40, and particle sorting apparatus 30 according to the present embodiment.

A flow cell 90 according to the present embodiment includes a flow cell body portion 91. Flow cell body portion 91 has a first end portion 92a, a second end portion 92b opposite to first end portion 92a, and an outer side surface 92s extending between first end portion 92a and second end portion 92b. Flow cell body portion 91 is provided with a flow channel 95. Second end portion 92b is provided with a nozzle receiving portion 93 communicating with flow channel 95. Flow channel 95 extends from first end portion 92a to nozzle receiving portion 93. Nozzle receiving portion 93 is tapered toward flow channel 95. Flow cell 90 further includes a convex lens 120. Convex lens 120 is attached on a portion of outer side surface 92s of flow cell body portion 91 close to second end portion 92b. Nozzle receiving portion 93 is located at a side close to second end portion 92b relative to an optical axis 120p of convex lens 120.

Light 117 emitted from particle 145 is refracted by convex lens 120 attached to outer side surface 92s of flow cell body portion 91. Convex lens 120 decreases the spreading angle of light 117. Convex lens 120 can guide, to detection optical system 123, light 117 emitted in a wider angle range. Moreover, since nozzle receiving portion 93 is tapered toward flow channel 95, an amount of light vignetted by nozzle 100 in light 117 emitted from particle 145 is decreased. Flow cell 90 enables that the identification information that characterizes each particle 145 flowing in flow channel 95 is detected with a larger amount of light 117. Accordingly, flow cell 90 enables that the identification information that characterizes each particle 145 is detected with improved sensitivity.

Convex lens 120 is attached to the portion of outer side surface 92s of flow cell body portion 91 close to second end portion 92b. Accordingly, nozzle channel 106 can be close to optical axis 120p of convex lens 120. The break-off point at which jet flow 140 is broken off into droplet 144 can be close to optical axis 120p of convex lens 120, whereby the identification information that characterizes particle 145 can be detected at a position closer to the break-off point. Flow cell 90 enables that particle 145 is sorted with improved sorting precision.

In flow cell 90 according to the present embodiment, a second angle $\alpha$ is more than or equal to a first angle $\theta$. First angle $\theta$ is given by $\sin^{-1}$ (NA/n). NA represents a numerical aperture of convex lens 120, and n represents a refractive index of flow cell body portion 91. Second angle $\alpha$ is an angle between a tapered surface 94 of nozzle receiving portion 93 and optical axis 120p of convex lens 120 in a cross section defined by a first direction (z direction) in which flow channel 95 extends and a second direction (x direction) in which optical axis 120p of convex lens 120 extends. Accordingly, light 117 in flow cell body portion 91 to be guided to detection optical system 123 by convex lens 120 can be prevented from being vignetted by tapered surface 94 (nozzle 100) of nozzle receiving portion 93. Flow cell 90 enables that the identification information that characterizes particle 145 is detected with improved sensitivity.

In flow cell 90 according to the present embodiment, a second angle between a tapered surface 94 of nozzle receiving portion 93 and optical axis 120p of convex lens 120 is more than or equal to 30° in a cross section defined by a first direction (z direction) in which flow channel 95 extends and a second direction (x direction) in which optical axis 120p of convex lens 120 extends. An amount of light vignetted by tapered surface 94 (nozzle 100) of nozzle receiving portion 93 in light 117 emitted from particle 145 is decreased. Flow cell 90 enables that the identification information that characterizes particle 145 is detected with improved sensitivity.

In flow cell 90 according to the present embodiment, a first distance $d_1$ between optical axis 120p of convex lens 120 and an end portion 96 of flow channel 95 close to nozzle receiving portion 93 is less than or equal to 2.0 mm in a cross section defined by a first direction (z direction) in which flow channel 95 extends and a second direction (x direction) in which optical axis 120p of convex lens 120 extends. Hence, nozzle channel 106 may be disposed close to optical axis 120p of convex lens 120. The break-off point at which jet flow 140 is broken off into droplet 144 can be close to optical axis 120p of convex lens 120, whereby the identification information that characterizes particle 145 can be detected at a position closer to the break-off point. Particle 145 can be sorted with improved sorting precision.

In flow cell 90 according to the present embodiment, a first length $L_1$ of flow channel 95 in a third direction (y direction) is larger than a second length $L_2$ of flow channel 95 in a second direction (x direction). The second direction (x direction) is a direction in which optical axis 120p of convex lens 120 extends. The third direction (y direction) is perpendicular to the second direction (x direction) and a first direction (z direction) in which flow channel 95 extends. Therefore, an amount of light vignetted by the surface of flow channel 95 in light 117 emitted from particle 145 is decreased. Flow cell 90 enables that the identification information that characterizes particle 145 is detected with improved sensitivity.

Flow cell 90 according to the present embodiment further includes a nozzle 100. Nozzle 100 includes a third end portion 104 having a tapered shape. Third end portion 104 is received in nozzle receiving portion 93. Nozzle 100 is provided with a nozzle channel 106 communicating with flow channel 95. Nozzle channel 106 has a cross sectional area smaller than a cross sectional area of flow channel 95. Third end portion 104 is located at the side close to second end portion 92b relative to optical axis 120p of convex lens 120.

Third end portion 104 has a tapered shape. Third end portion 104 is located at the side close to second end portion 92b relative to optical axis 120p of convex lens 120. Therefore, an amount of light vignetted by nozzle 100 in light 117 emitted from particle 145 is decreased. Flow cell 90 enables that the identification information that characterizes particle 145 is detected with improved sensitivity.

Further, third end portion 104 is received in nozzle receiving portion 93. Accordingly, nozzle channel 106 can be close to optical axis 120p of convex lens 120. The break-off point at which jet flow 140 is broken off into droplet 144 can be close to optical axis 120p of convex lens 120, whereby the identification information that characterizes particle 145 can be detected at a position closer to the break-off point. Flow cell 90 enables that particle 145 is sorted with improved sorting precision.

In flow cell 90 according to the present embodiment, a third angle $\beta$ is equal to a second angle $\alpha$. Second angle $\alpha$ is an angle between a tapered surface 94 of nozzle receiving portion 93 and optical axis 120p of convex lens 120 in a cross section defined by a first direction (z direction) in which flow channel 95 extends and a second direction (x direction) in which optical axis 120p of convex lens 120 extends. Third angle $\beta$ is an angle between tapered surface 101 of nozzle 100 and optical axis 120p of convex lens 120 in the cross section. Hence, tapered surface 101 of nozzle 100 makes surface contact with tapered surface 94 of nozzle receiving portion 93. Nozzle 100 is self-aligned with flow channel 95 to align nozzle channel 106 with flow channel 95. Particle 145 can be sorted with improved precision.

In flow cell 90 according to the present embodiment, a second distance $d_2$ between optical axis 120p of convex lens 120 and an end portion 107 of nozzle channel 106 close to flow channel 95 is less than or equal to 2.0 mm in a cross section defined by a first direction (z direction) in which flow channel 95 extends and a second direction (x direction) in which optical axis 120p of convex lens 120 extends. Hence, nozzle channel 106 is disposed close to optical axis 120p of convex lens 120. The break-off point at which jet flow 140 is broken off into droplet 144 can be close to optical axis 120p of convex lens 120, whereby the identification information that characterizes particle 145 can be detected at a position closer to the break-off point. Particle 145 can be sorted with improved sorting precision.

A flow chamber 40 according to the present embodiment includes: flow cell 90 according to the present embodiment;

and a chamber 41 attached to flow cell 90. A cavity 42 of chamber 41 communicates with flow channel 95. Since flow chamber 40 includes flow cell 90, the identification information that characterizes particle 145 can be detected with improved sensitivity and particle 145 can be sorted with improved sorting precision.

A particle sorting apparatus 30 according to the present embodiment includes: flow chamber 40 according to the present embodiment; and a detection optical system 123 optically coupled to convex lens 120. Detection optical system 123 includes a detection side lens optical system 124. Since particle sorting apparatus 30 of the present embodiment includes flow cell 90, the identification information that characterizes particle 145 can be detected with improved sensitivity and particle 145 can be sorted with improved sorting precision.

Particle sorting apparatus 30 according to the present embodiment further includes an alignment unit 80 that aligns flow channel 95 with detection side lens optical system 124. Since flow channel 95 is aligned with detection side lens optical system 124 using alignment unit 80, particle sorting apparatus 30 can detect, with improved sensitivity, the identification information that characterizes particle 145.

Particle sorting apparatus 30 according to the present embodiment further includes an imaging unit 137 and a controller 170. Imaging unit 137 is optically coupled to detection side lens optical system 124. Controller 170 controls alignment unit 80 based on an output from imaging unit 137. Hence, particle sorting apparatus 30 can detect, with improved sensitivity, the identification information that characterizes particle 145.

Particle sorting apparatus 30 according to the present embodiment further includes a housing 35 and a transparent window member 121. Housing 35 includes a first space 37 to be sterilized. Transparent window member 121 is hermetically fitted in an opening 36b of housing 35. Flow cell 90 and chamber 41 are disposed in first space 37. Transparent window member 121 fluidly separates detection side lens optical system 124 from first space 37. First space 37 can be sterilized without causing damage in detection side lens optical system 124. Further, with convex lens 120, working distance WD (see FIG. 7) can be long. Therefore, even when transparent window member 121 is disposed between convex lens 120 and detection optical system 123, detection optical system 123 can be readily incorporated into particle sorting apparatus 30 without transparent window member 121 mechanically interfering with detection optical system 123.

Second Embodiment

Figure 13:
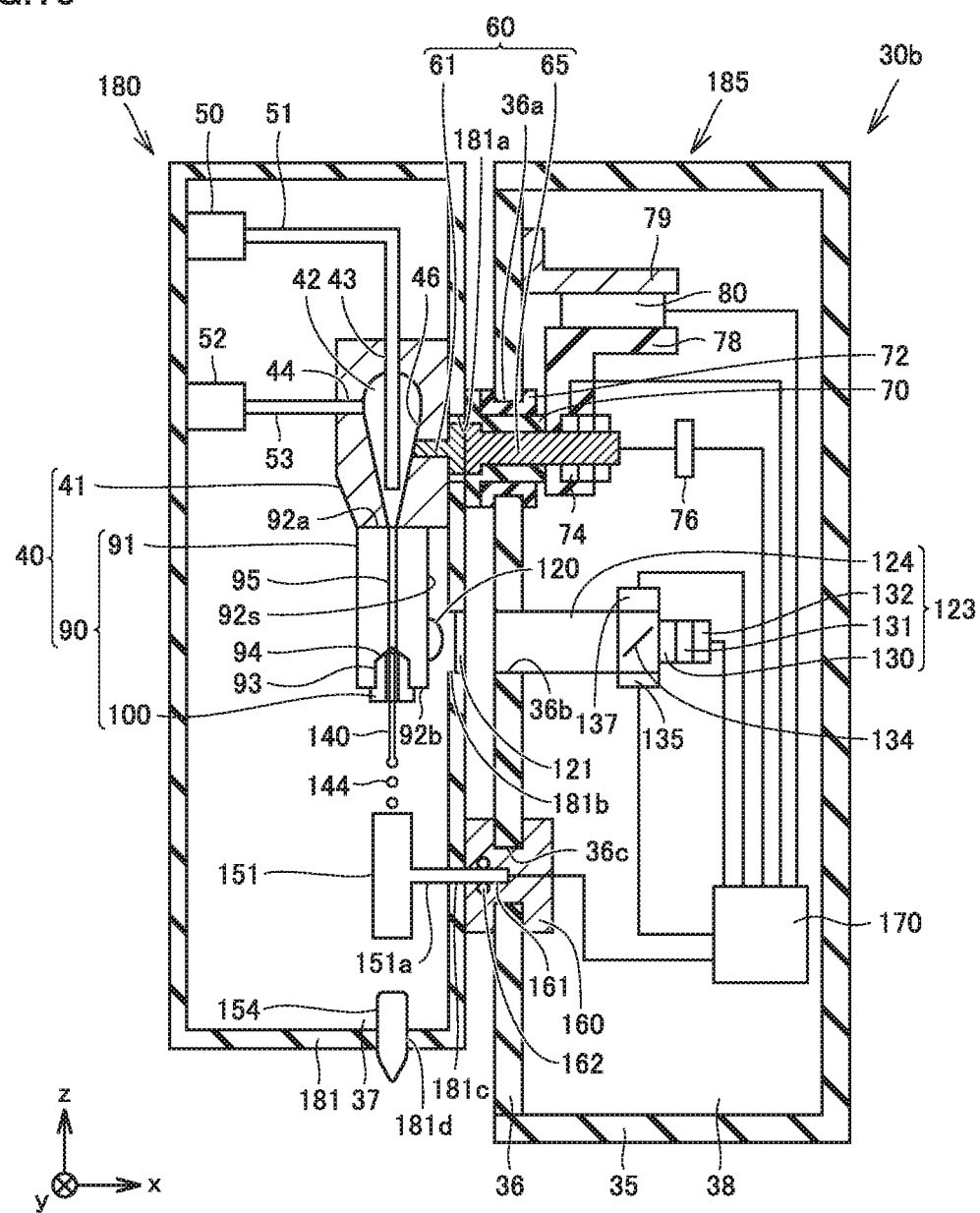
FIG. 13 is a schematic cross sectional view of a particle sorting apparatus according to a second embodiment (in which a particle sorting apparatus cartridge is attached to a housing).
Figure 14:
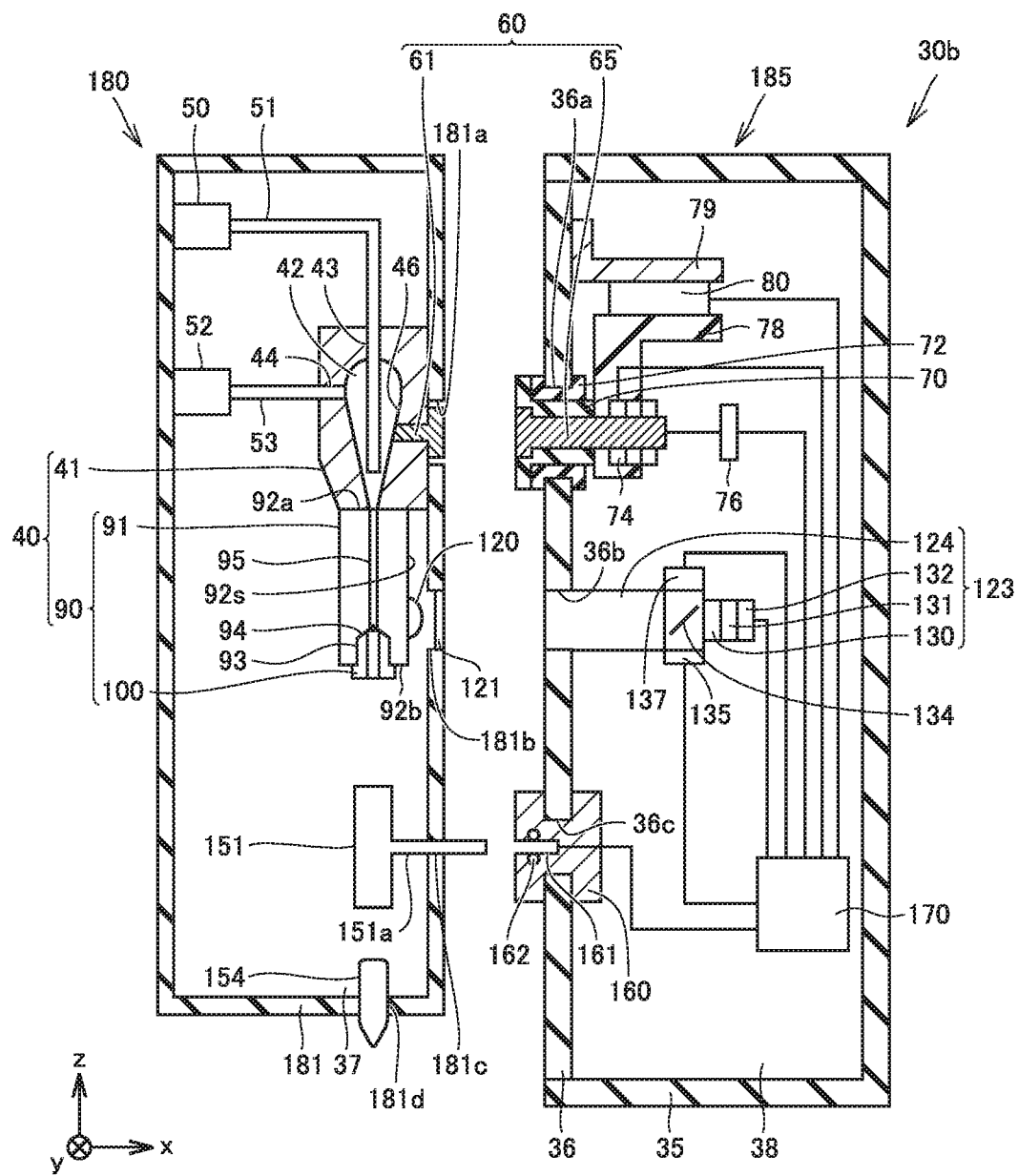
FIG. 14 is a schematic cross sectional view of the particle sorting apparatus according to the second embodiment (in which the particle sorting apparatus cartridge is detached from the housing).

With reference to FIG. 13 and FIG. 14, the following describes a particle sorting apparatus 30b and a particle sorting apparatus cartridge 180 according to a second embodiment. Particle sorting apparatus 30b of the present embodiment includes a configuration similar to that of particle sorting apparatus 30 of the first embodiment, and is different therefrom mainly in the following points.

In the present embodiment, housing 35 includes no first space 37. Separation wall 36 partitions second space 38 and an external space, which is an open space. Particle sorting apparatus 30b includes particle sorting apparatus cartridge 180. Particle sorting apparatus cartridge 180 can be attached to and detached from housing 35. Particle sorting apparatus cartridge 180 can be discarded after finishing sorting particles 145 included in the sample liquid. Accordingly, particles 145 included in the sample liquid can be sorted without cross contamination and carryover.

Particle sorting apparatus cartridge 180 mainly includes a cartridge case 181, flow chamber 40, a transparent window member 121, and sample collection members 154, 155. Particle sorting apparatus cartridge 180 may further include waste liquid collection member 156. Flow chamber 40 is contained in first space 37, which is an internal space of cartridge case 181. First space 37 is a closed space and first space 37 is maintained to be in a hermetic state. First space 37 is sterilized by applying radiation or heat thereto, and is maintained to be in the sterile state. Transparent window member 121 is hermetically fitted in opening 181b of cartridge case 181. Collection unit 153 (sample collection members 154, 155 and waste liquid collection member 156) is attached to cartridge case 181. Specifically, collection unit 153 (sample collection members 154, 155 and waste liquid collection member 156) is hermetically fitted in opening 181d of cartridge case 181.

Particle sorting apparatus cartridge 180 further includes sample liquid source unit 50 and first conduit 51. Particle sorting apparatus cartridge 180 may further include sheath liquid source unit 52 and second conduit 53. Sample liquid source unit 50, first conduit 51, sheath liquid source unit 52, and second conduit 53 are contained in first space 37. Sample liquid source unit 50, first conduit 51, sheath liquid source unit 52, and second conduit 53 are incorporated in first space 37 within a sterile space such as a safety cabinet. Particle sorting apparatus cartridge 180 may further include vibration electrode portion 61. Vibration electrode portion 61 is inserted in opening 181a of cartridge case 181. Opening 181a of cartridge case 181 is closed by vibration electrode portion 61 and chamber 41. Particle sorting apparatus cartridge 180 may further include deflection plates 151, 152. Extension portions 151a, 152a of deflection plates 151, 152 are hermetically fitted to opening 181c of cartridge case 181.

Particle sorting apparatus 30b and particle sorting apparatus cartridge 180 according to the present embodiment exhibits the following effects in addition to the effects of particle sorting apparatus 30 according to the first embodiment.

A particle sorting apparatus cartridge 180 according to the present embodiment includes: a flow chamber 40, a cartridge case 181, a transparent window member 121, and a sample collection member 154, 155. Cartridge case 181 contains flow chamber 40. Transparent window member 121 faces convex lens 120 and is hermetically fitted in an opening 181b of cartridge case 181. Sample collection member 154, 155 collects a droplet 144 ejected from flow cell 90 and is attached to cartridge case 181. Particle sorting apparatus cartridge 180 is discarded after finishing sorting particles 145 included in the sample liquid. According to particle sorting apparatus 30b and particle sorting apparatus cartridge 180 according to the present embodiment, particles 145 included in the sample liquid can be sorted without cross contamination and carryover.

Third Embodiment

Figure 15:
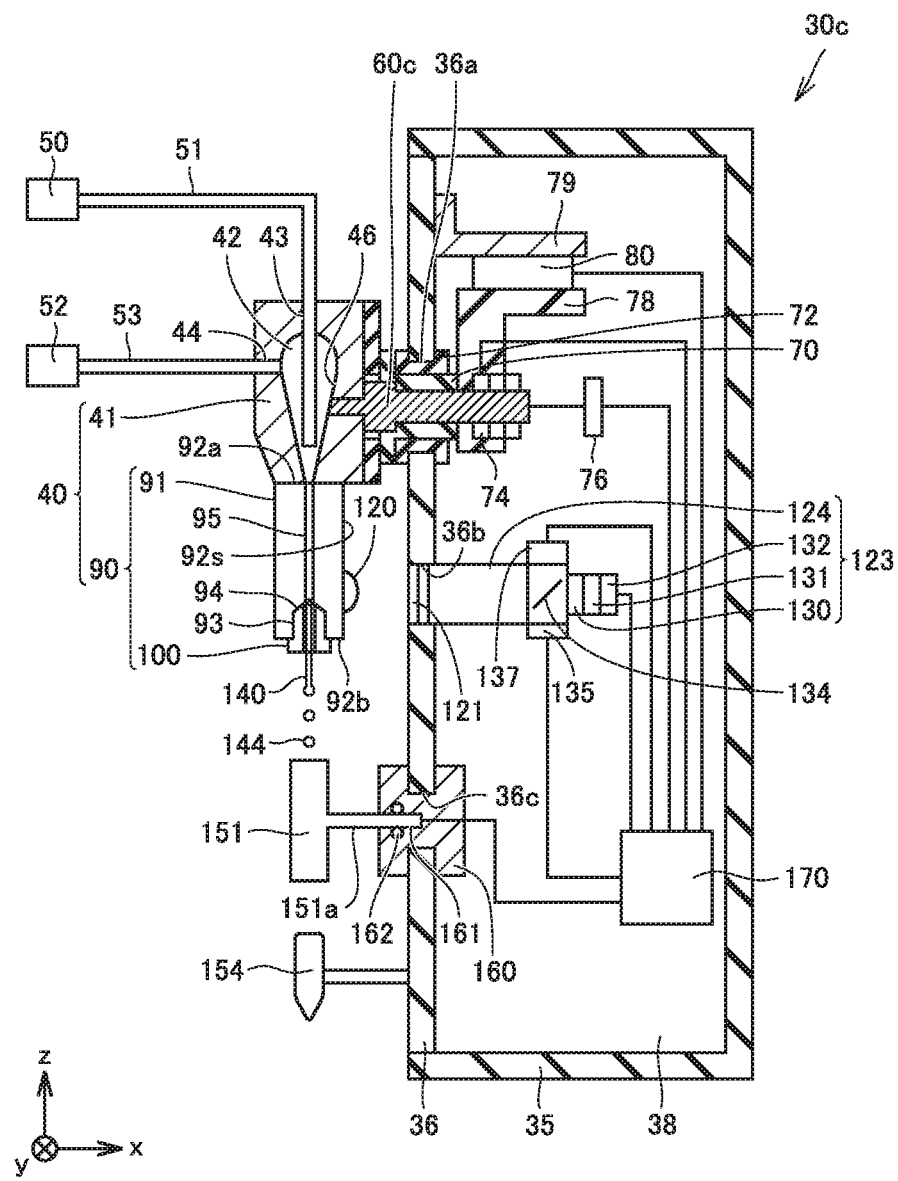
FIG. 15 is a schematic cross sectional view of a particle sorting apparatus according to a third embodiment.
Figure 16:
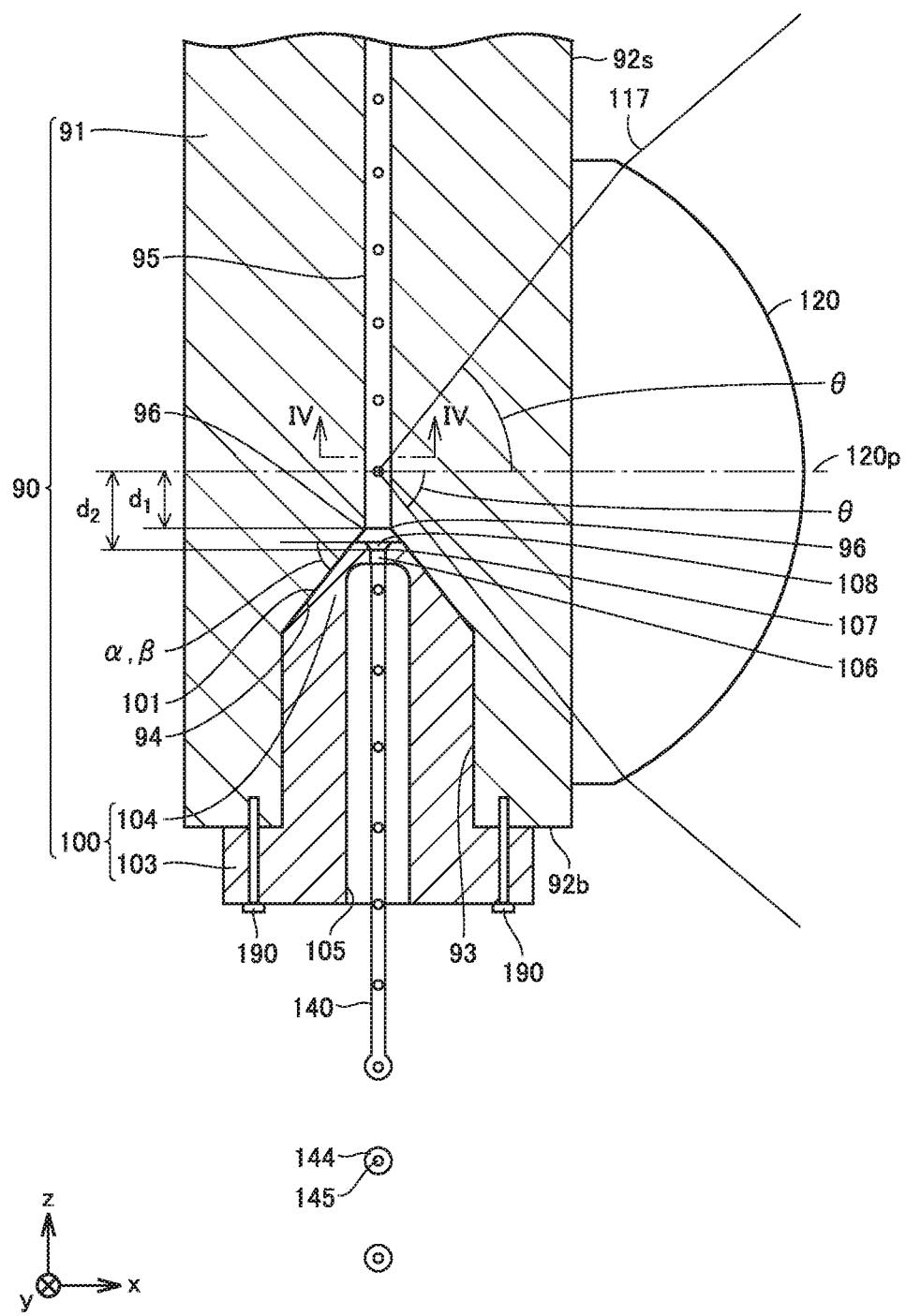
FIG. 16 is a schematic partial enlarged cross sectional view of a flow cell according to the third embodiment.

With reference to FIG. 15 and FIG. 16, the following describes flow cell 90, flow chamber 40, and a particle sorting apparatus 30c according to a third embodiment. Flow cell 90, flow chamber 40, and particle sorting apparatus 30c according to the present embodiment include configurations similar to those of flow cell 90, flow chamber 40, and particle sorting apparatus 30 according to the first embodiment, and are different therefrom mainly in the following points.

In the present embodiment, housing 35 is provided with no first space 37. Separation wall 36 partitions second space 38 and an external space, which is an open space. Flow chamber 40 is disposed in an external space. Sorting unit 150 (for example, deflection plates 151, 152) and collection unit 153 (for example, sample collection members 154, 155, and waste liquid collection member 156) are disposed in the external space. As shown in FIG. 15, in the present embodiment, vibration electrode portion 61 (see FIG. 1) and electrically conductive portion 65 (see FIG. 1) are in one piece in vibration electrode 60c. Transparent window member 121 may be omitted.

As shown in FIG. 16, nozzle 100 is detachably coupled to flow cell body portion 91. In one example, nozzle 100 may be detachably attached to flow cell body portion 91 using a fixing member 190 such as a screw, a threaded screw, or a pin. In another example, nozzle 100 may be detachably screwed into flow cell body portion 91.

Flow cell 90, flow chamber 40, and particle sorting apparatus 30c according to the present embodiment exhibits the following effects in addition to the effects of flow cell 90, flow chamber 40, and particle sorting apparatus 30 according to the first embodiment. Since nozzle channel 106 has a cross sectional area smaller than that of flow channel 95, clogging with particles 145 included in the sample liquid is most likely to occur in nozzle channel 106. In flow cell 90 of the present embodiment, nozzle 100 is detachably coupled to flow cell body portion 91. Accordingly, when nozzle channel 106 is clogged with particle 145, it is not necessary to exchange the whole of flow chamber 40 and only nozzle 100 may be exchanged. Even though flow chamber 40 cannot be detached from housing 35, nozzle 100 can be exchanged readily at low cost.

Examples

Figure 17:
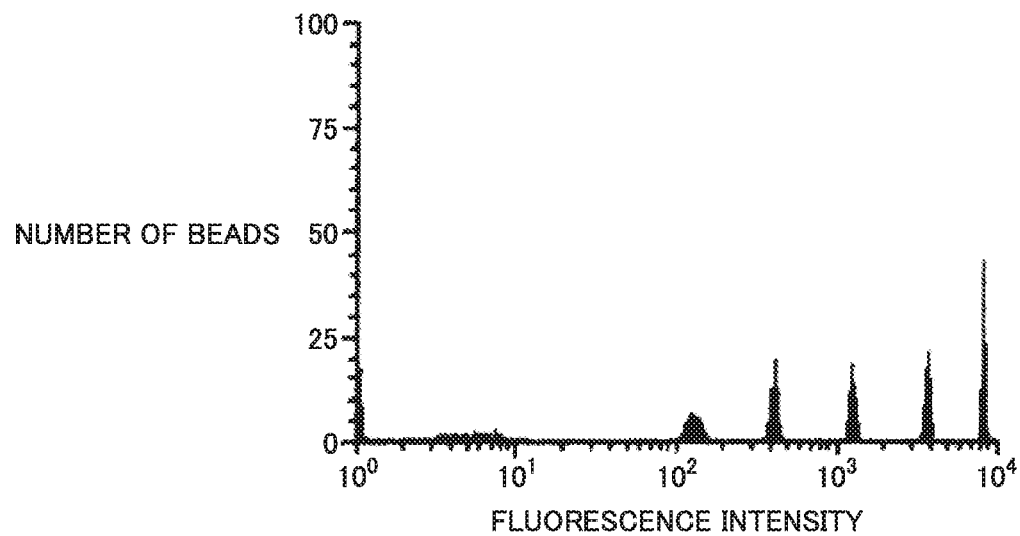
FIG. 17 showing fluorescence data in a FITC channel according to an Example 1.
Figure 18:
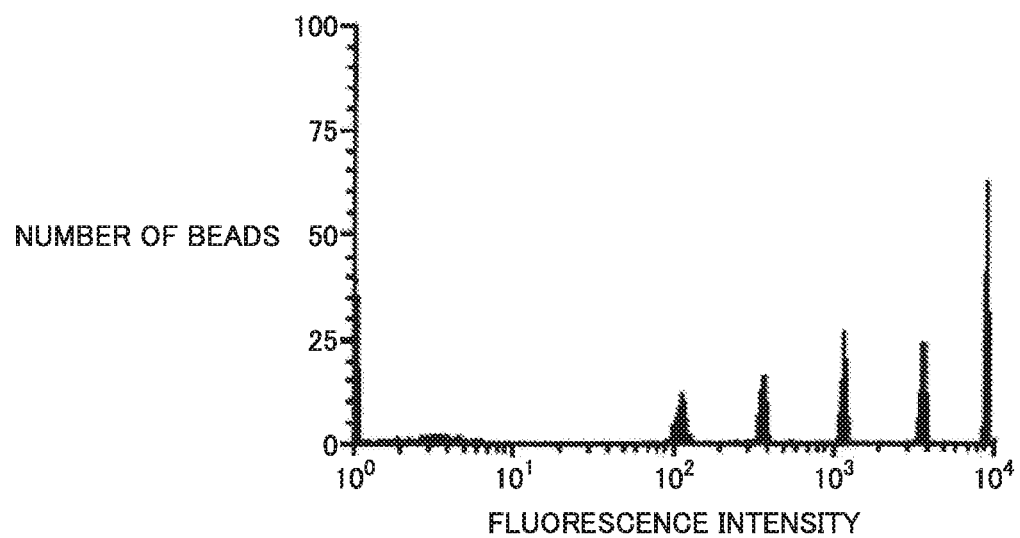
FIG. 18 shows fluorescence data in a PE channel according to an Example 2.

Examples will be described with reference to FIG. 17 and FIG. 18. In the present example, particles 145 were sorted using particle sorting apparatus 30 of the first embodiment. Specifically, each of flow cell body portion 91 and convex lens 120 is composed of quartz. Convex lens 120 is welded to outer side surface 92s of flow cell body portion 91. First angle θ is 43.3° and convex lens 120 has a numerical aperture (NA) of 1.00. Second distance $d_2$ between optical axis 120p of convex lens 120 and end portion 107 of nozzle channel 106 is 1.0 mm. Flow channel 95 has a cross sectional area of 160 μm (first length $L_1$)×150 μm (second length $L_2$), for example. Nozzle channel 106 has a cross sectional area of 70 μm×70 μm, for example.

Particles 145 used in the present example are 10,000 beads (SPHERO™ Rainbow Calibration Particles RCP-30-5). The beads include: beads labeled with at least one of five types of fluorophores from which fluorescences (light 117) having different wavelengths are emitted; and beads not labeled with a fluorophore.

In an Example 1, fluorescence data of the 10,000 beads in a fluorescein isothiocyanate (FITC) channel was obtained. The horizontal axis of the fluorescence data shown in FIG. 17 represents a fluorescence intensity, and the vertical axis represents the number of beads. From the fluorescence data of Example 1, an MESF of 75 was obtained as an index of the detection sensitivity of particle sorting apparatus 30.

In an Example 2, fluorescence data of 10,000 beads in a phycoerythrin (PE) channel was obtained. The horizontal axis of the fluorescence data shown in FIG. 18 represents a fluorescence intensity, and the vertical axis represents the number of beads. From the fluorescence data of Example 2, an MESF of 28 was obtained as an index of the detection sensitivity of particle sorting apparatus 30.

MESF is an abbreviation of Molecular Equivalent of Soluble Fluorophore, and means the number of fluorescence molecules per bead in the present example. As the MESF is lower, particle sorting apparatus 30 can detect, with higher sensitivity, the identification information that characterizes the bead. In each of Example 1 and Example 2, a high-sensitivity particle sorting apparatus 30 having an MESF of less than or equal to 100 was obtained.

The first to third embodiments disclosed herein should be regarded as being illustrative and non-restrictive in any respect. At least two of the first to third embodiments disclosed herein may be combined as long as there is no contradiction. For example, nozzle 100 in each of the first embodiment and the second embodiment may be detachably coupled to flow cell body portion 91 in the same manner as nozzle 100 of the third embodiment. Vibration electrode 60c of the third embodiment may be replaced with vibration electrode 60 of the first embodiment. The scope of the present invention is defined by the terms of the claims, rather than the embodiments described above, and is intended to include any modifications within the scope and meaning equivalent to the terms of the claims.

REFERENCE SIGNS LIST 30, 30b, 30c: particle sorting apparatus; 35: housing; 36: separation wall; 36a, 36b, 36c, 161, 181a, 181b, 181c, 181d: opening; 37: first space; 38: second space; 40: flow chamber; 41: chamber; 42: cavity; 43: first inlet; 44: second inlet; 46: surface; 50: sample liquid source unit; 51: first conduit; 52: sheath liquid source unit; 53: second conduit; 54: filter; 60, 60c: vibration electrode; 61: vibration electrode portion; 62: first flange portion; 63: first shank portion; 63a: end surface; 64: protrusion; 65: electrically conductive portion; 66: second flange portion; 67: second shank portion; 68: recess; 70: insulation sleeve; 72: sealing member; 74: vibration element; 76: charge supply unit; 78: movable member; 79: fixing portion; 80: alignment unit; 90: flow cell; 91: flow cell body portion; 92a: first end portion; 92b: second end portion; 92s: outer side surface; 93: nozzle receiving portion; 94: tapered surface; 95: flow channel; 96: end portion; 100: nozzle; 101: tapered surface; 103: flange portion; 104: third end portion; 105: nozzle cavity portion; 106: nozzle channel; 107: end portion; 108: tapered channel; 110: light source unit; 110a, 110b, 110c, 110d, 110e, 110f, 110g: laser unit; 111: excitation light; 112: optical path conversion unit; 117: light; 120: convex lens; 120p: optical axis; 121: transparent window member; 123: detection optical system; 124: detection side lens optical system; 124a, 124b, 124c, 124d, 124e, 124f, 124g, 124h, 124i, 124j, 124k: lens; 130: optical fiber array; 130f: optical fiber; 131: wavelength division unit; 131f: wavelength filter; 131g: reflective mirror; 132: light detection unit; 132f: light detector; 134: reflective member; 135: reflective member driving unit; 137: imaging unit; 140: jet flow; 144: droplet; 145: particle; 150: sorting unit; 151, 152: deflection plate; 151a, 152a: extension portion; 153: collection unit; 154, 155: sample collection member; 156: waste liquid collection member; 160: connector; 162: O ring; 170: controller; 180: particle sorting apparatus cartridge; 181: cartridge case; 190: fixing member; NA: numerical aperture; WD: working distance.

The invention claimed is:

1. A flow cell comprising:
   a flow cell body portion, the flow cell body portion having a first end portion, a second end portion opposite to the first end portion, and an outer side surface extending between the first end portion and the second end portion, the flow cell body portion being provided with a flow channel, the second end portion being provided with a nozzle receiving portion communicating with the flow channel, the flow channel extending from the first end portion to the nozzle receiving portion, the nozzle receiving portion being tapered toward the flow channel; and
   a convex lens attached on a portion of the outer side surface close to the second end portion, wherein the nozzle receiving portion is located at a side close to the second end portion relative to an optical axis of the convex lens.

2. The flow cell according to claim 1, wherein
   a second angle is more than or equal to a first angle,
   the first angle is given by $\sin^{-1}$ (NA/n), where NA represents a numerical aperture of the convex lens, and n represents a refractive index of the flow cell body portion, and
   the second angle is an angle between a tapered surface of the nozzle receiving portion and the optical axis in a cross section defined by a first direction in which the flow channel extends and a second direction in which the optical axis extends.

3. The flow cell according to claim 1, wherein a second angle between a tapered surface of the nozzle receiving portion and the optical axis is more than or equal to 30° in a cross section defined by a first direction in which the flow channel extends and a second direction in which the optical axis extends.

4. The flow cell according to claim 1, wherein a first distance between the optical axis and an end portion of the flow channel close to the nozzle receiving portion is less than or equal to 2.0 mm in a cross section defined by a first direction in which the flow channel extends and a second direction in which the optical axis extends.

5. The flow cell according to claim 1, wherein
   a first length of the flow channel in a third direction is larger than a second length of the flow channel in a second direction,
   the second direction is a direction in which the optical axis of the convex lens extends, and
   the third direction is perpendicular to the second direction and a first direction in which the flow channel extends.

6. The flow cell according to claim 1, further comprising a nozzle including a third end portion having a tapered shape, wherein
   the third end portion is received in the nozzle receiving portion, the nozzle is provided with a nozzle channel communicating with the flow channel, the nozzle channel has a cross sectional area smaller than a cross sectional area of the flow channel, and the third end portion is located at the side close to the second end portion relative to the optical axis of the convex lens.

7. The flow cell according to claim 6, wherein
   a third angle is equal to a second angle,
   the second angle is an angle between a tapered surface of the nozzle receiving portion and the optical axis in a cross section defined by a first direction in which the flow channel extends and a second direction in which the optical axis extends, and
   the third angle is an angle between the tapered surface of the nozzle and the optical axis in the cross section.

8. The flow cell according to claim 6, wherein a second distance between the optical axis and an end portion of the nozzle channel close to the flow channel is less than or equal to 2.0 mm in a cross section defined by a first direction in which the flow channel extends and a second direction in which the optical axis extends.

9. The flow cell according to claim 6, wherein the nozzle is detachably coupled to the flow cell body portion.

10. A flow chamber comprising:
    the flow cell recited in claim 1; and
    a chamber attached to the flow cell, wherein
    a cavity of the chamber communicates with the flow channel.

11. A particle sorting apparatus comprising:
    the flow chamber recited in claim 10; and
    a detection optical system optically coupled to the convex lens, wherein the detection optical system includes a detection side lens optical system.

12. The particle sorting apparatus according to claim 11, further comprising an alignment unit that aligns the flow channel with the detection side lens optical system.

13. The particle sorting apparatus according to claim 12, further comprising:
    an imaging unit optically coupled to the detection side lens optical system; and
    a controller that controls the alignment unit based on an output from the imaging unit.

14. The particle sorting apparatus according to claim 11, further comprising:
    a housing provided with a first space to be sterilized; and
    a transparent window member that is hermetically fitted in an opening of the housing, wherein
    the flow cell and the chamber are disposed in the first space, and
    the transparent window member fluidly separates the detection side lens optical system from the first space.

15. A particle sorting apparatus cartridge comprising:
    the flow chamber recited in claim 10;
    a cartridge case that contains the flow chamber;
    a transparent window member that faces the convex lens and that is hermetically fitted in an opening of the cartridge case; and
    a sample collection member that collects a droplet ejected from the flow cell and that is attached to the cartridge case.

* * * * *